United States Patent
Mondal et al.

(10) Patent No.: US 10,873,698 B1
(45) Date of Patent: Dec. 22, 2020

(54) METHOD AND SYSTEM FOR IMPROVING EFFICIENCY OF OPTICAL CAMERA COMMUNICATION

(71) Applicant: Wipro Limited, Bangalore (IN)

(72) Inventors: Subhas Chandra Mondal, Bangalore (IN); Shailesh Prabhu, Manipal (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/542,411

(22) Filed: Aug. 16, 2019

(30) Foreign Application Priority Data

Jun. 17, 2019 (IN) .............................. 201941024035

(51) Int. Cl.
*H04N 5/232* (2006.01)
*H04N 5/235* (2006.01)

(52) U.S. Cl.
CPC ......... *H04N 5/23227* (2018.08); *H04N 5/235* (2013.01); *H04N 5/23232* (2013.01)

(58) Field of Classification Search
CPC . H04N 5/23227; H04N 5/235; H04N 5/23232
See application file for complete search history.

(56) References Cited

U.S. PATENT DOCUMENTS

| | | | |
|---|---|---|---|
| 6,798,445 B1 | 9/2004 | Brumitt et al. | |
| 6,933,956 B2 | 8/2005 | Sato et al. | |
| 8,295,307 B2 | 10/2012 | Eitan | |
| 2005/0254714 A1 | 11/2005 | Anne | |
| 2008/0123567 A1* | 5/2008 | Suzuki | H04L 1/1822 |
| | | | 370/277 |
| 2009/0135307 A1* | 5/2009 | Kurita | H04N 21/41407 |
| | | | 348/729 |
| 2014/0327364 A1* | 11/2014 | Bischof | H05B 47/18 |
| | | | 315/158 |
| 2017/0093490 A1 | 3/2017 | Breuer et al. | |
| 2017/0093491 A1 | 3/2017 | Breuer et al. | |

FOREIGN PATENT DOCUMENTS

JP 2004072365 A 3/2004

OTHER PUBLICATIONS

Du, W., et al., "SoftLight: Adaptive Visible Light Communication over Screen-Camera Links", IEEE INFOCOM, 2016, (9 pages).
Extended European Search Report issued in European Application No. 1920008.0, dated Apr. 30, 2020 (9 pages).

* cited by examiner

*Primary Examiner* — Mekonnen D Dagnew
(74) *Attorney, Agent, or Firm* — Finnegan, Henderson, Farabow, Garrett & Dunner, LLP

(57) ABSTRACT

A method and a system for improving efficiency of a bi-directional optical camera communication between a first OCC device and a second OCC device are disclosed. In an embodiment, the method may include estimating, by a first OCC device comprising a first display device and a first camera device, a first transmission parameter with respect to the first display device and a first reception parameter with respect to the first camera device. The first reception parameter is based on a second transmission parameter of a second OCC device or a channel condition parameter, and the second transmission parameter is derived from an analysis of information captured by the second OCC device from the first OCC device. The method may further include dynamically modifying, by the first OCC device, the first transmission parameter based on the first reception parameter in order to maximize throughput of OCC.

20 Claims, 22 Drawing Sheets

Table 1

| Frame Rate (fps) | Transmitted Date (Bytes) | Received Data for multi-symbol transmission (Bytes) | Received Data for single-symbol transmission (Bytes) | Packet Error Rate for multi-symbol transmission (%) | Packet Error Rate for single-symbol transmission (%) |
|---|---|---|---|---|---|
| 2 | 5000 | 4875 | 4500 | 2.5 | 10 |
| 4 | 5000 | 4750 | 4000 | 5 | 20 |
| 5 | 5000 | 3625 | 3000 | 27.5 | 40 |
| 7 | 5000 | 3000 | 3000 | 40 | 40 |
| 10 | 5000 | 2000 | 3000 | 60 | 40 |

FIG. 6

```
root@ayush-ThinkPad-L430:/home/shailesh/occ/qr_grid/shailesh# lscpu
Architecture:          x86_64
CPU op-mode(s):        32-bit, 64-bit
Byte Order:            Little Endian
CPU(s):                4
On-line CPU(s) list:   0-3
Thread(s) per core:    2
Core(s) per socket:    2
Socket(s):             1
```

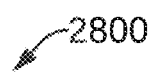

Estimate, by a first OCC device comprising a first display device and a first camera device, at least one first transmission parameter with respect to the first display device and at least one first reception parameter with respect to the first camera device, wherein the at least one first reception parameter is based on at least one second transmission parameter of a second OCC device or at least one channel condition parameter, and wherein the at least one second transmission parameter is derived from an analysis of information captured by the second OCC device from the first OCC device 2802

Dynamically modify the at least one first transmission parameter based on the at least one first reception parameter in order to maximize throughput of OCC 2804

FIG. 28

METHOD AND SYSTEM FOR IMPROVING EFFICIENCY OF OPTICAL CAMERA COMMUNICATION

TECHNICAL FIELD

This disclosure relates generally to optical camera communication (OCC), and more particularly to a method and a system for improving efficiency of a bi-directional OCC.

BACKGROUND

There is a growing need for an alternate wireless communication medium to augment the network capacity provided by the Radio Frequency (RF) spectrum. Visible light is one such medium that can double up as a data communication medium. Thus, visible light communication (VLC) or optical wireless communication (OWC) involve communication over a light channel by transmit-receive pair. The transceiver pair can transmit information using a Light Emitting Diode (LED) and receive using a light sensor such as a photo diode or a camera. For example, in some cases, the VLC/OWC may take the form of light fidelity (Li-Fi) technology that employs LED as the transmitter and a photodetector as the receiver. The adoption of Li-Fi technology is slow or limited due to the fact that the standard devices need to have a built in Li-Fi transceiver. Alternatively, in some cases, the VLC/OWC may take the form of optical camera communication (OCC) technology that employs screen or spatially arranged LEDs as a transmitter and camera as a receiver. Thus, OCC may be enabled with a software application running on a standard device, without any need for hardware changes.

In OCC, a camera based receiver is involved in receiving the transmitted information and decoding the received information, while a screen based transmitter or a spatially arranged LEDs based transmitter is involved in encoding information and transmitting the encoded information. The information may be encoded in form of an image or a spatially arranged color codes that may then be transmitted in frames. The received frames (i.e., captured image or color codes) may then processed to extract the encoded information. For example, in a screen based transmission scheme, a set of color patterns may be used to encode the information. Quick Response (QR) code based communication that displays QR codes in a screen is an example of spatially arranged coding scheme used in OCC. In such scheme, the information to be transmitted may be broken up in smaller blocks to generate a sequence of QR code. Each QR code is displayed for a small time-interval before the next QR code is displayed. Camera capture rate determines the display interval for a QR code. Similarly, for example, in LED based transmission scheme, the information to be transmitted may be encoded by color codes emitted by a set of spatially arranged LEDs. In such case, the color emitted by each LED may carry a number of bits from the information block depending on the number of colors that may be decoded by the receiving camera. If more number of colors are used to encode the information, the overall throughput may increase. However, the receiving camera sensitivity, distance between the transceivers, background illumination and media condition play an important role in determining how many colors may be used to encode the transmitted information.

In both the forms of OCC mechanisms explained above (i.e., screen based transmission and LED based transmission), the receiving camera may take a picture of the frame as seen through the free space between the transmit source and the camera. Depending on the distance between the transmit and receive pair and the optical resolution of the camera, the size of the received image of the transmit frame may vary. A transmit frame is a spatial arrangement of light sources of distinct colors. The size of the received image of the transmit frame may determine the ability to distinguish the colors in the spatial arrangement which in turn may determine the ability to decode the information correctly. If there is information loss in the received image resulting in the incorrect decoding of the received information, the overall system throughput will decrease. Information loss may be due to long distance, low camera resolution, background illumination, and opaqueness of the media between the transmitter and the receiver.

In other words, in absence of rate adaptation, the system throughput may be sub-optimal under different conditions. Thus, conventional techniques are limited with respect to employing a mechanism of rate adaptation in the context of OCC to increase the system throughput. More generally, current techniques fail to adaptively adjust transmit-receive parameters to maximize the system throughput.

SUMMARY

In one embodiment, a method of improving efficiency of a bi-directional optical camera communication (OCC) is disclosed. In one example, the method may include estimating, by a first OCC device comprising a first display device and a first camera device, at least one first transmission parameter with respect to the first display device and at least one first reception parameter with respect to the first camera device. The at least one first reception parameter is based on at least one second transmission parameter of a second OCC device or at least one channel condition parameter, while the at least one second transmission parameter is derived from an analysis of information captured by the second OCC device from the first OCC device. The method may further include dynamically modifying, by the first OCC device, the at least one first transmission parameter based on the at least one first reception parameter in order to maximize throughput of OCC.

In another embodiment, a system for improving efficiency of a bi-directional OCC is disclosed. In one example, the system may include a first OCC device comprising a first display device, a first camera device, a processor, and a computer-readable medium communicatively coupled to the processor. The computer-readable medium may store processor-executable instructions, which, on execution, may cause the processor to estimate at least one first transmission parameter with respect to the first display device and at least one first reception parameter with respect to the first camera device. The at least one first reception parameter is based on at least one second transmission parameter of a second OCC device or at least one channel condition parameter, while the at least one second transmission parameter is derived from an analysis of information captured by the second OCC device from the first OCC device. The processor-executable instructions, on execution, may further cause the processor to dynamically modify the at least one first transmission parameter based on the at least one first reception parameter in order to maximize throughput of OCC.

In yet another embodiment, a non-transitory computer-readable medium storing computer-executable instructions for improving efficiency of a bi-directional OCC is disclosed. In one example, the stored instructions, when executed by a processor, may cause the processor to perform operations including estimating at least one first transmission parameter with respect to a first display device and at least one first reception parameter with respect to a first camera device. The first camera device and the first display device are a part of the first OCC device. Additionally, the at least one first reception parameter is based on at least one second transmission parameter of a second OCC device or at least one channel condition parameter, while the at least one second transmission parameter is derived from an analysis of information captured by the second OCC device from the first OCC device. The operations may further include dynamically modifying the at least one first transmission parameter based on the at least one first reception parameter in order to maximize throughput of OCC.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 is an exemplary tabular result of packet error rate estimation for multi-symbol transmission and single-symbol transmission per frame, in accordance with some embodiments of the present disclosure.

FIG. 10 is an exemplary information about Central Processing Unit (CPU) architecture from lscpu command, in accordance with some embodiments of the present disclosure.

FIG. 11 illustrates an exemplary htop Graphical User Interface (GUI), in accordance with some embodiments of the present disclosure.

FIG. 12 illustrates an exemplary htop GUI for assigning of cores, in accordance with some embodiments of the present disclosure.

FIG. 28 is a flow diagram of a method of improving efficiency of a bi-directional OCC between a first OCC device and a second OCC device, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
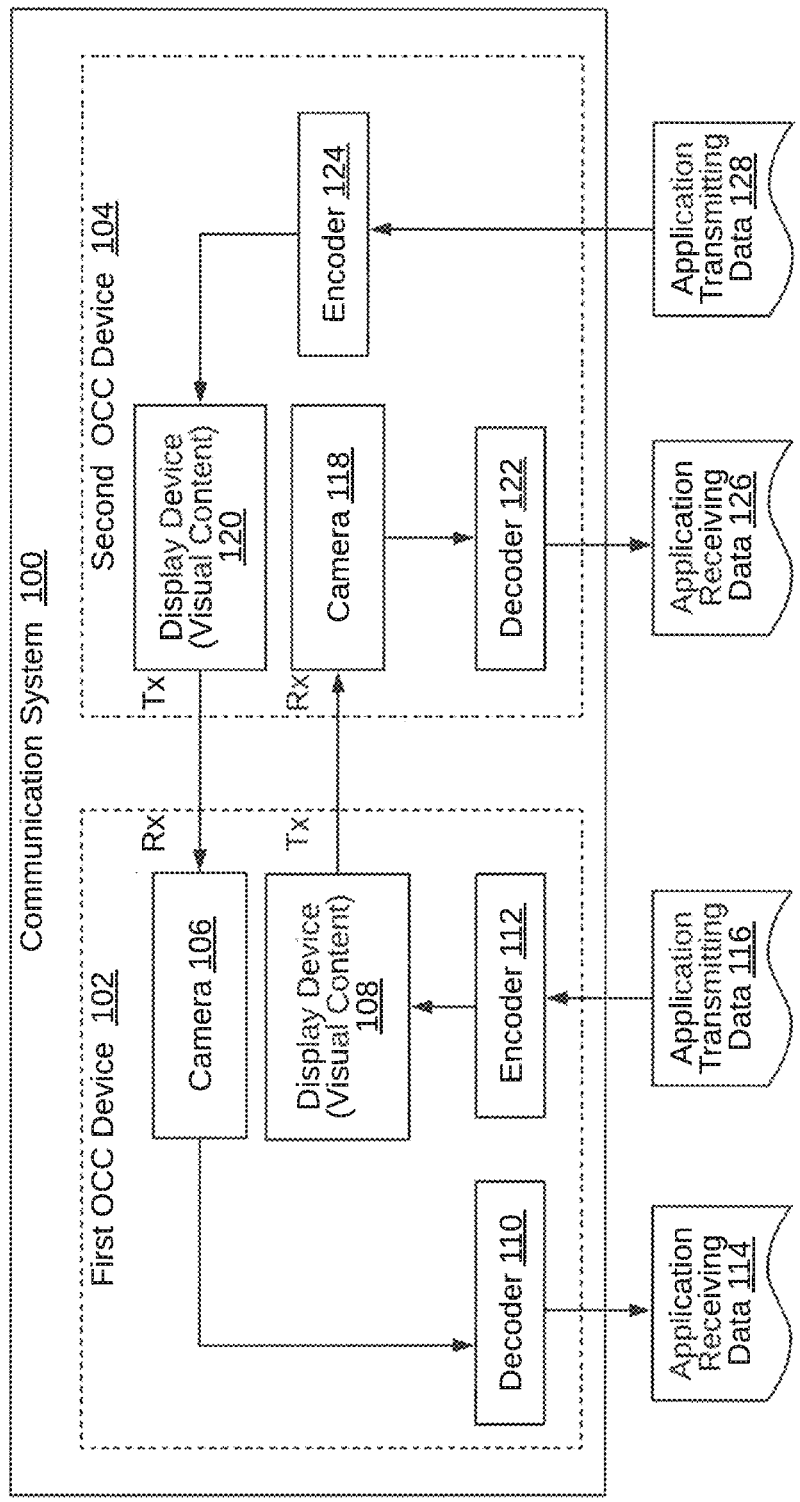
FIG. 1 illustrates a typical system for implementing optical camera communication (OCC) between a first OCC device and a second OCC device.

FIG. 1 illustrates a typical optical camera communication (OCC) system 100 for implementing a bi-directional OCC between a first OCC device 102 and a second OCC device 104. The communication system 100 may include a first OCC device 102 and a second OCC device 104. The first OCC device 102 may include a first camera 106 and a first display device 108. The second OCC device 104 may include a second camera 118 and a second display device 120. Each of the display devices 108 and 120 may be a screen based display or spatially arranged LED Matrix, capable of transmitting visual content. The first camera 106 and the second display device 120 may together form a first transmission-reception system. Similarly, the second camera 118 and the first display device 108 together form a second transmission-reception system. The first OCC device 102 may further include a first decoder 110 and a first encoder 112. Similarly, the second OCC device 104 may include a second decoder 122 and a second encoder 124. Application receiving data 114 and 126 and application transmitting data 116 and 128 may interface with the transmitter-receiver systems. An application may interact with the transmission system for sending the data, while the application mat interact with the receiver system for receiving the data.

The first OCC device 102 may receive application transmitting data 116 which may further be encoded by the first encoder 112. This encoded information may be then transmitted to a receiver via a visual content in the form of a transmit frame displayed by the first display device 108. Each of the first display device 108 and the second display device 120 may be a screen based display or spatially arranged LED Matrix. The second camera 118 (receiver camera) may capture the image of this transmit frame and decode the encoded information in the decoder 122. The decoded information may be post processed in an application receiving data 126.

Figure 2:
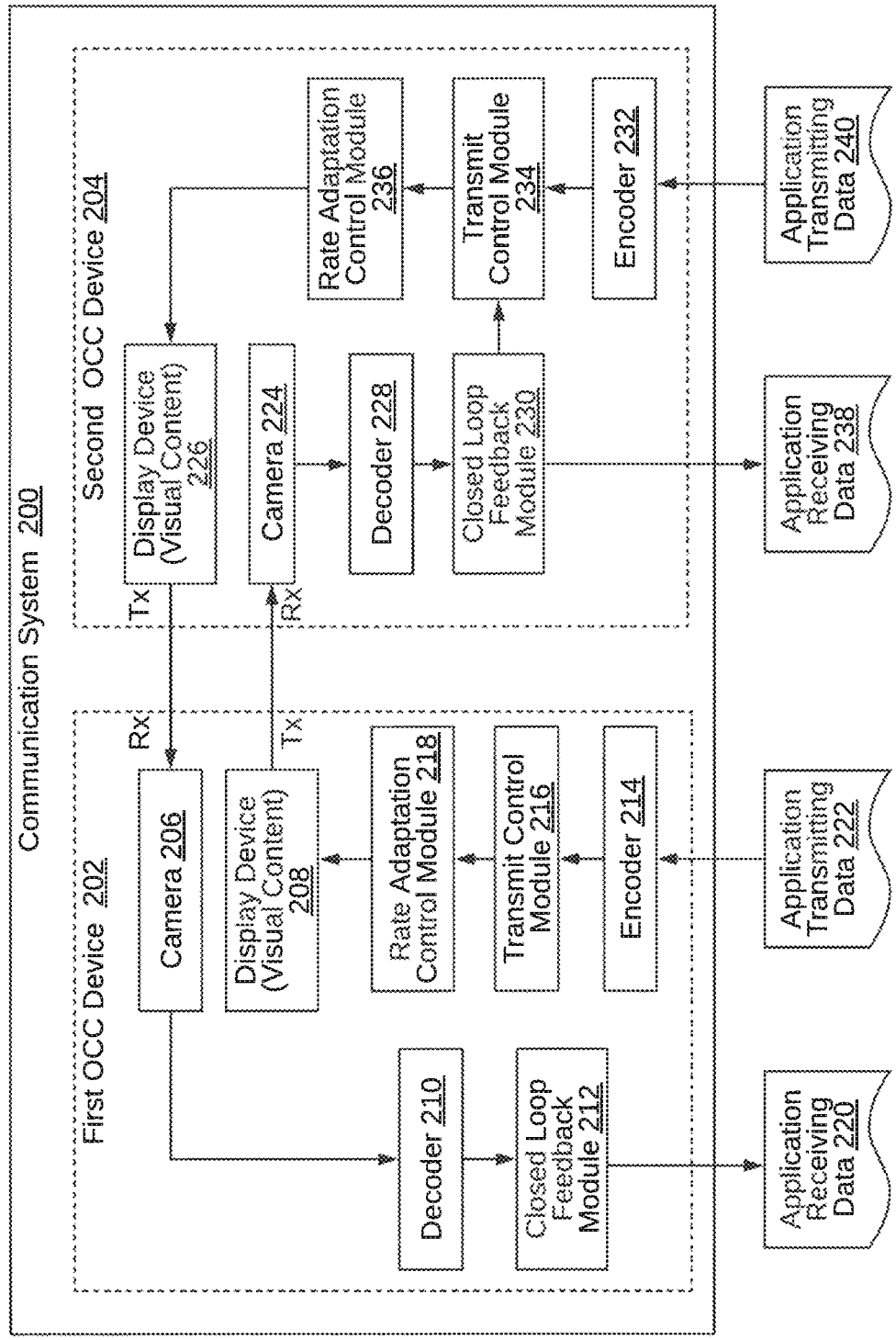
FIG. 2 illustrates an exemplary system for implementing OCC between a first OCC device and a second OCC device, in accordance with some embodiments of the present disclosure.

Referring now to FIG. 2, an exemplary OCC system 200 for implementing OCC between a first OCC device 202 and a second OCC device 204 is illustrated, in accordance with an embodiment of the present disclosure. The first OCC device 202 may include a camera 206, a display device 208, a decoder 210, a closed loop feedback module 212, an encoder 214, a transmit control module 216, and a rate adaptation control module 218. Corresponding to the first OCC device 202, the second OCC device 204 may include a camera 224, a display device 226, a decoder 228, a closed loop feedback module 230, an encoder 232, a transmit control module 234, and a rate adaptation control module 236. The rate adaptation control modules 218 and 236 are further explained in conjunction with FIG. 3.

Figure 3:
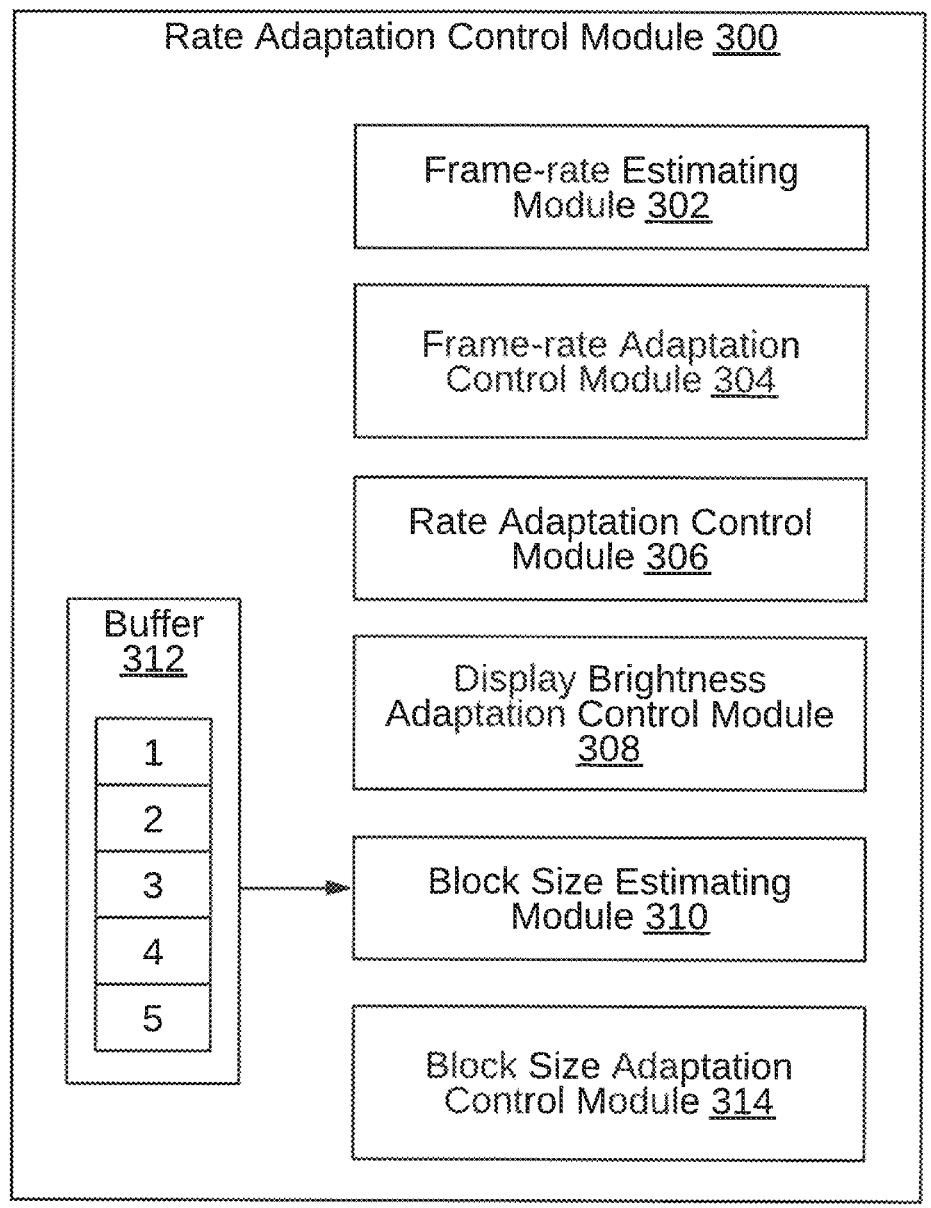
FIG. 3 is a functional block diagram of a rate adaptation control module, in accordance with some embodiments of the present disclosure.

Referring now to FIG. 3, a rate adaptation control module 300 (corresponding to rate adaptation control modules 218 and 236) is illustrated in accordance with an embodiment. The rate adaptation control module 300 may include a frame-rate estimating module 302, a frame-rate adaptation control module 304, a rate adaptation control module 306, a display brightness adaptation control module 308, a block size estimating module 310, a buffer 312, and a block size adaptation control module 314.

The frame-rate estimating module 302 may estimate frame rate parameter of the transmitter. Depending on the successful reception of the packets at a receiver, a transmitter application may require the frame-rate estimating module 302 to increase or decrease the frame rate of the transmitter, through the frame-rate adaptation control module 304. The frame-rate adaptation control module 304 may be assisted by the frame-rate estimating module 302 to adaptively control the frame rate of the transmitter by communicating with the transmitter application. The frame-rate adaptation control module 304 may carry out Version Controlled Re-Transmission (VCR) whenever there is a Negative Acknowledgment (NACK) from the receiver, when a NACK score (i.e., channel quality indication) is more than a threshold value $[N_T]$. The frame-rate adaptation control module 304 may, thereby, monitor Packet Loss Error Rate (PLER) and optimize a number of retransmission frames in the transmit buffer.

The display brightness adaptation control module 308 may address power concerns in the screen-based communication. The display brightness adaptation control module 308 may control display brightness of the screen-based transmitter and may set optimal brightness level required by the transmitter. The block size estimating module 310 may estimate size of a required block size. Buffer 312 may provide the application with a set of data fragments with the block size specified by the application. The buffer 312 may include data fragments of variable length. Once the block size estimating module 310 sends the block size length required, the buffer 312 may return a set of fragments with the size specified in the block size length, which may then be forwarded to the transmitter application, through the block size adaptation control module 314. The buffer 312 may store transmit information. The buffer 312 may further provide the same to the block size estimating module 310, whenever required. The block size adaptation control module 314 may assist the application in adaptively controlling the block size by communicating with the transmitter application.

It should be noted that all such aforementioned modules may be implemented in programmable hardware devices such as programmable gate arrays, programmable array logic, programmable logic devices, or the like. Alternatively, all such aforementioned modules may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code could be a single instruction, or many instructions, and may even be distributed over several different code segments, among different applications, and across several memory devices.

Further, it may be understood that the display devices 208 and 226 may act as transmitters. These transmitters may be screen based, or a set of spatially arranged LEDs. In a screen based transmission scheme, a set of color patterns may be used to encode the information. In LED based transmission scheme, the information to be transmitted may be encoded by color codes emitted by a set of spatially arranged LEDs. It may be further understood that the cameras 206 and 224 may act as receivers. The cameras 206 and 224 may take a snap of free space between the transmit source and the camera, and may preserve the spatial information. This spatial information may be used to reconstruct what has been transmitted. The receiver system may also include a photodetector for ambient light measurement.

In some embodiments, the transmitter-receiver pairs may include a Quick Response (QR) code based rate adaptation, such as a screen-based QR code at the transmitter and camera at the receiver. Further, the screen-based QR code may either be based on dynamic transmit area, or fix transmit area. Further, the QR code based rate adaptation may include a dot matrix LED based color QR code at the transmitter, and a camera based receiver. In alternate embodiments, the transmitter-receiver pairs may include a color matrix based rate adaptation, based on spatial arrangement of LEDs at the transmitter and camera based receiver.

Signal to Noise Ratio (SNP) Control

Case 1: QR Code Based Transmitter and Camera Based Receiver

Figure 4:
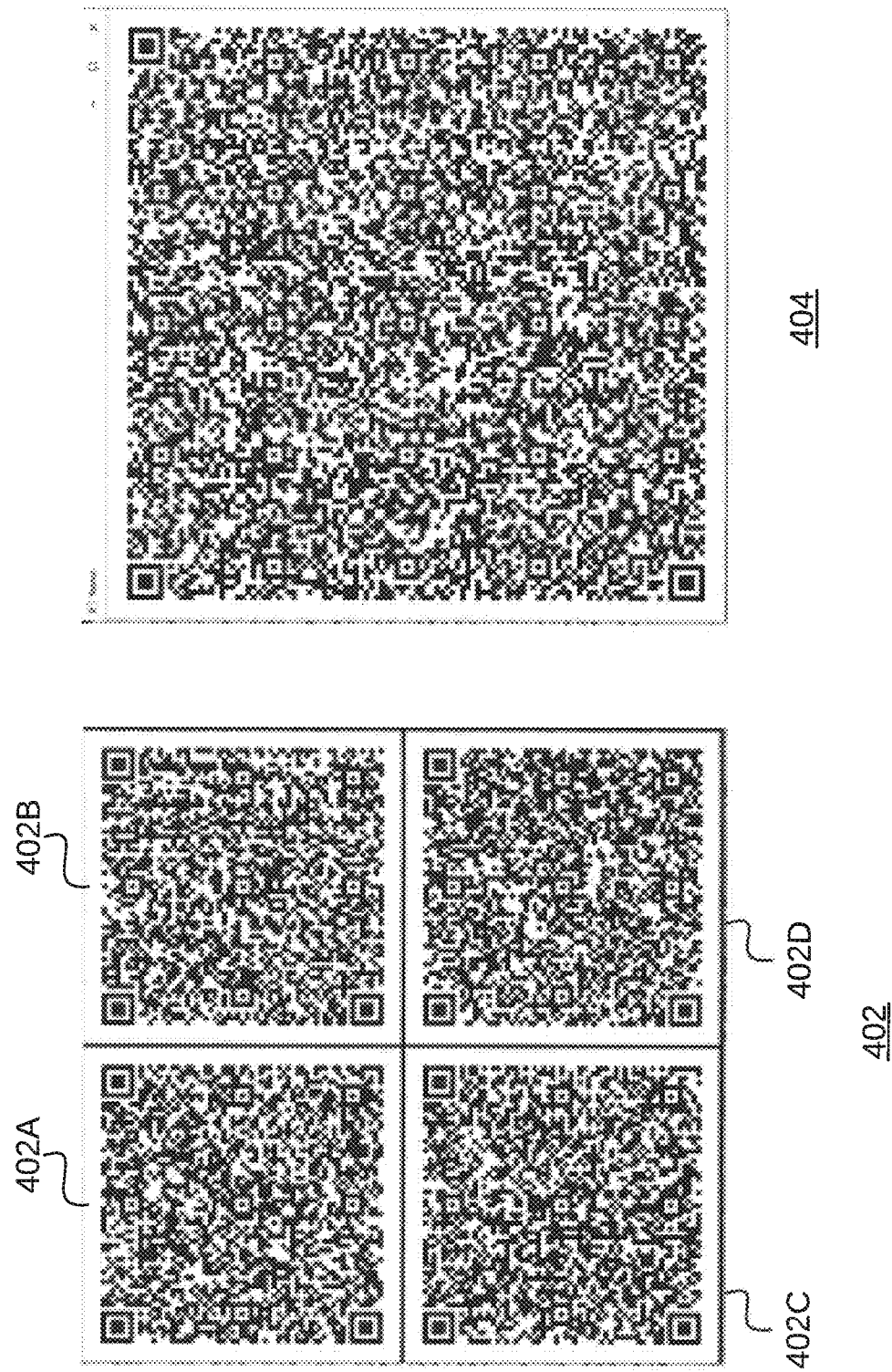
FIG. 4 illustrates a multi-symbol transmission per Quick Response (QR) code frame and a single-symbol transmission per QR code frame, in accordance with some embodiments of the present disclosure.

Referring now to FIG. 4, a multi-symbol transmission per QR code frame 402 and a single-symbol transmission per QR code frame 404 is illustrated, in accordance with an embodiment. As will be appreciated by those skilled in the art, under unfavorable conditions, carrying out a multi-symbol transmission per frame may decrease error propensity of the transmission. As shown in FIG. 4, a single QR code per frame containing a block of information 402 is divided into 4 individual QR codes (402A, 402B, 402C, 402D) per frame, containing the same amount of information as a whole. This may decrease the error propensity by at least by 25%, depending on the media conditions. It may be noted that another factor to be considered is the processing time of the transmit frame at the receiver. The processing time taken to decode four individual QR codes in a single frame is more compared to a single QR code per frame. Hence, the system throughput is limited by the computational power at the receiver.

Figure 5:
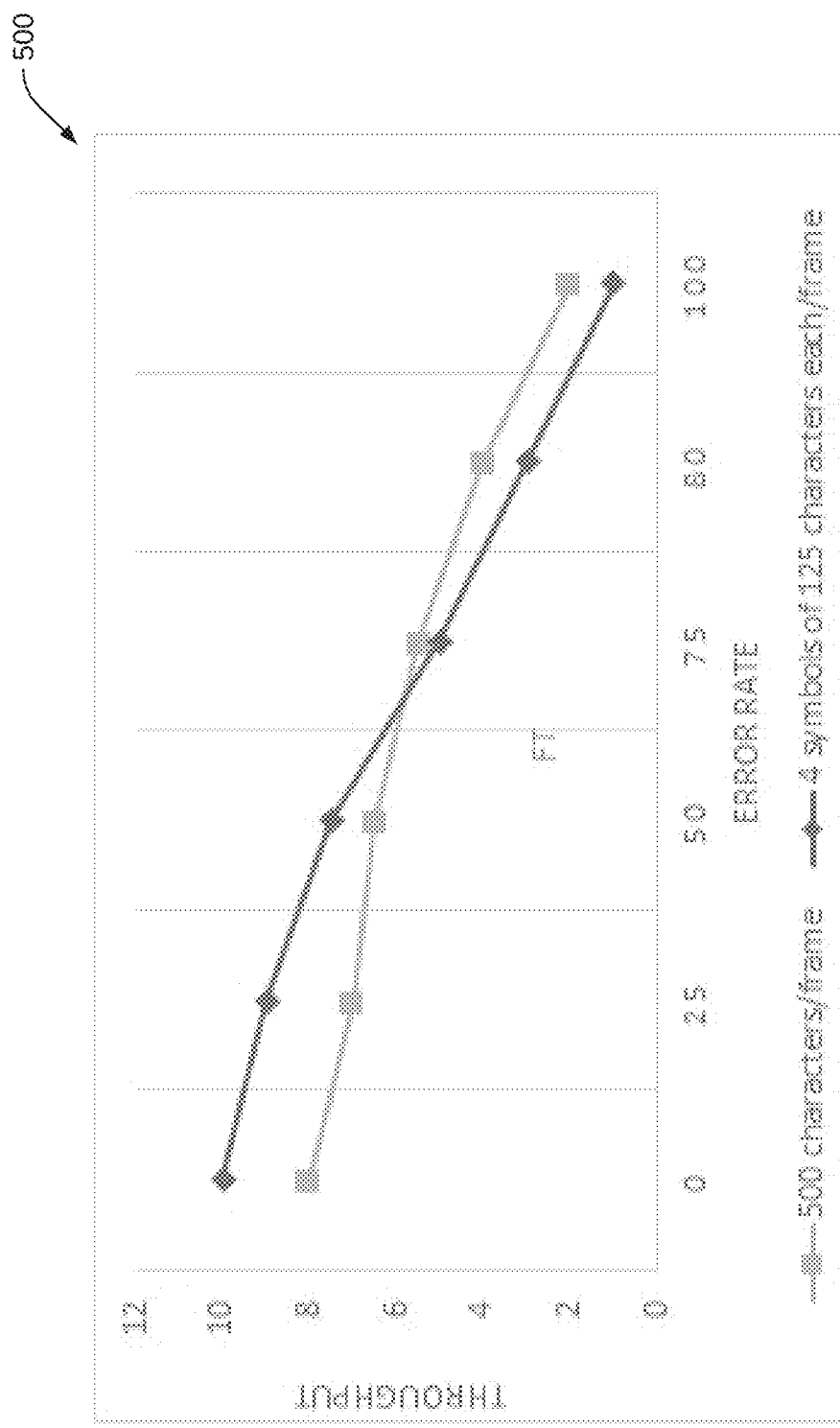
FIG. 5 is an exemplary graphical representation showing variation of throughput with respect to error rate, in accordance with some embodiments of the present disclosure.

According to observation in an experimentation study, multi-symbol transmission per frame produces higher throughput compared to the single-symbol transmission per frame, till a particular frame rate $[F_T]$. Once the transmit frame rate goes beyond this threshold, due to the processing time constraint at the receiver side (in decoding the information in the transmit frame), the single-symbol transmission per frame performs better than multi-symbol transmission per frame. The results of this experimentation study is depicted in FIG. 5. FIG. 5 is a graphical representation 500 showing variation of throughput with respect to error rate.

The experiment further estimated system constraint in terms of the processing capability. Accordingly, during transmission, the transmit frame rate may be continuously monitored. For lower frame rates (<$F_T$), each block of information may be encoded into multiple QR codes in a single frame, to achieve higher throughput. Once the transmit frame rate goes beyond $F_T$, single-symbol transmission may be carried out, by encoding a block of information to a single QR code in a frame. The experiment of the performance of single-symbol transmission and multi-symbol transmission under ambient light scenario was carried out in following the conditions:

| | |
|---|---|
| Screen Resolution | 1400 * 1050 pixels |
| Block size | 500 Bytes |
| Distance between screen based transmitter and camera based receiver | 60 cm |
| Testbed | Processor used is Intel ® Core ™ i5-3320M CPU @ 2.60 GHz with 4 cores, belonging to the Family 6 (Pentium Pro), |
| Camera | A laptop webcam with 1.3 MP resolution, at the receiver end) |

The results of the packet error rate estimation for multi-symbol transmission and single-symbol transmission per frame are illustrated via Table 1 shown in FIG. 6, Referring now to FIG. 6, the Table 1 shows that for a given testbed, till Frame Rate=7 fps (frames per second), multi-symbol transmission per frame performs better than single-symbol transmission. After 7 fps, under compute resource constraint scenario at the receiver side, single-symbol transmission per frame performs better that multi-symbol transmission per frame.

Figure 7:
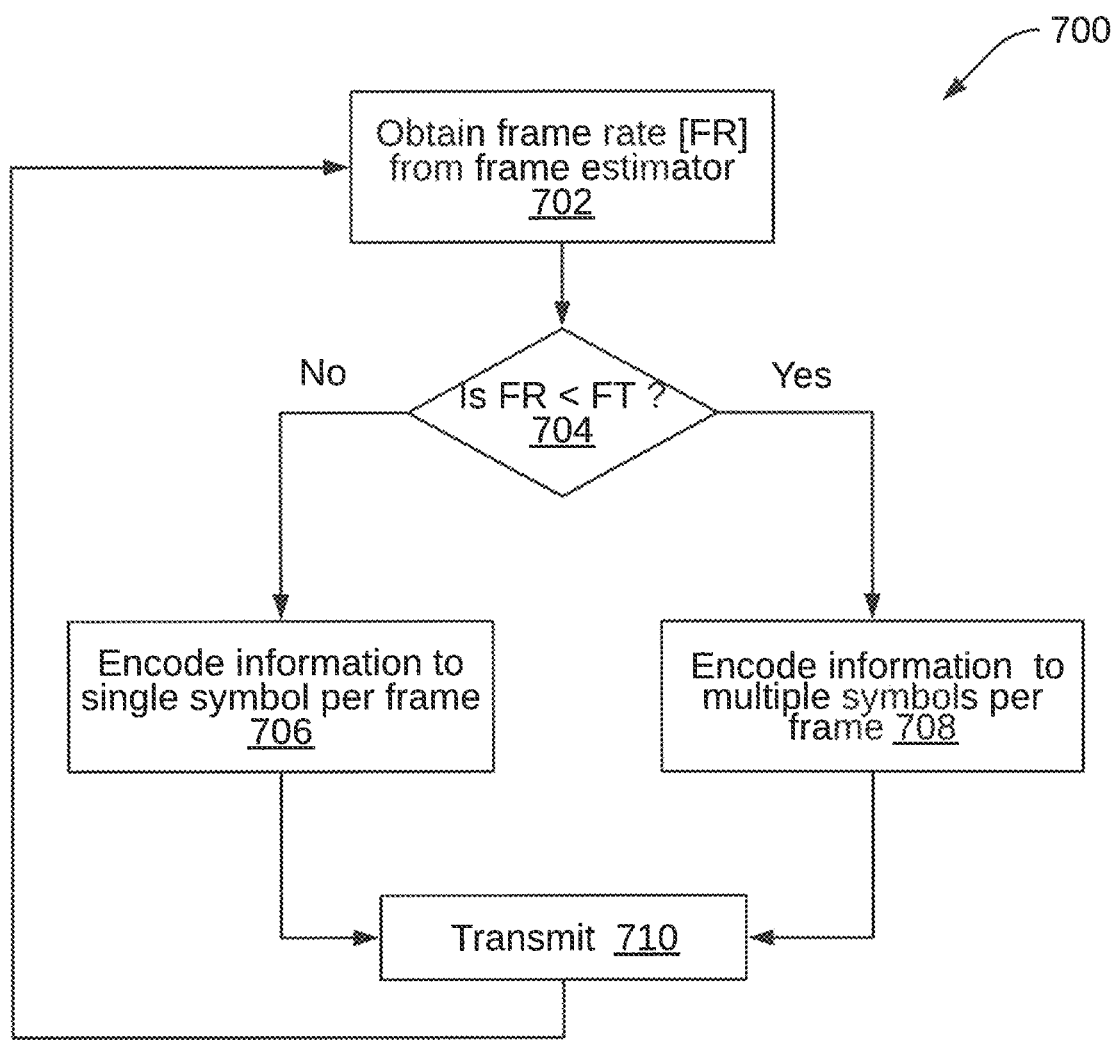
FIG. 7 is a flow diagram of an exemplary method of Signal to Noise Ratio (SNR) control mechanism, in accordance with some embodiments of the present disclosure.

Referring now to FIG. 7, a flow diagram of a method 700 of SNR control mechanism is illustrated, in accordance with an embodiment. At step 702, a frame rate $[F_R]$ may be obtained from the frame-rate estimating module 302. At step 704, a check may be performed to determine if the obtained frame rate $[F_R]$ is less than a threshold frame rate $[F_T]$. If the obtained frame rate $[F_R]$ is not less than the threshold frame rate $[F_T]$, the method may proceed to the step 706 ("No" path). At step 706, the information may be encoded to single symbol per frame. At step 710, transmission may be performed. Returning back to step 704, if the obtained frame rate $[F_R]$ is determined to be less than the threshold frame rate $[F_T]$, the method 700 may proceed to the step 708 ("Yes" path). At step 708, the information may be encoded into multiple symbols per frame. At step 710, once again, the encoded information may be transmitted. The method 700 may then once again proceed to step 702, and the process may be repeated.

Case 2: Color Matrix Based Transmitter and Camera Based Receiver.

Figure 8:
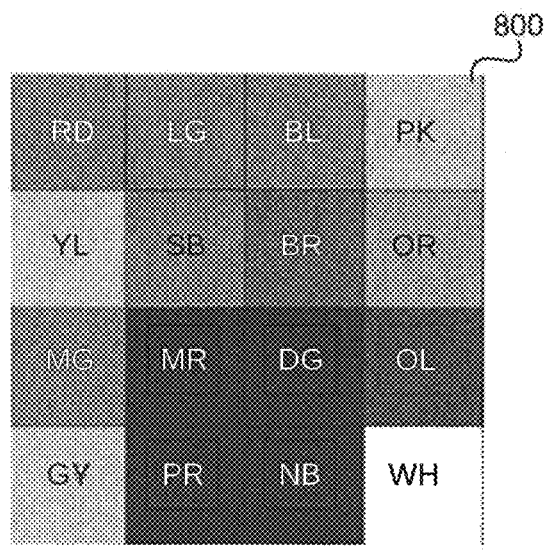
FIG. 8 illustrates a color matrix based transmit frame, in accordance with some embodiments of the present disclosure.

Referring now to FIG. 8, a transmit frame 800 based on color matrix based transmitter and camera based receiver is illustrated, in accordance with an embodiment. The transmit frame 800 may include a number of spatially arranged LEDs. The transmit frame 800 may be captured by a receiver camera and further processed to decode the information. Each LED in the matrix may represent a certain number of bits, depending on how many colors are present in the encoding color set. For example, if the color set includes 16 colors, then each LED may represent 4 bits of information. In general, a single LED may represent 'n' bits of information, if the color set consists of $2^n$ colors. By way of example, as illustrated, the transmit frame 800 includes 16 LEDs of 16 different colors including Red (RD), Light Green (LG), Blue (BL), Pink (PK), Yellow (YL), Sky Blue (SB), brown (BR), Orange (OR), Magenta (MG), maroon (MR), Dark Green (DG), Olive (OL), Grey (GY), Purple (PR), Navy Blue (NB), and White (WH).

Figure 9:
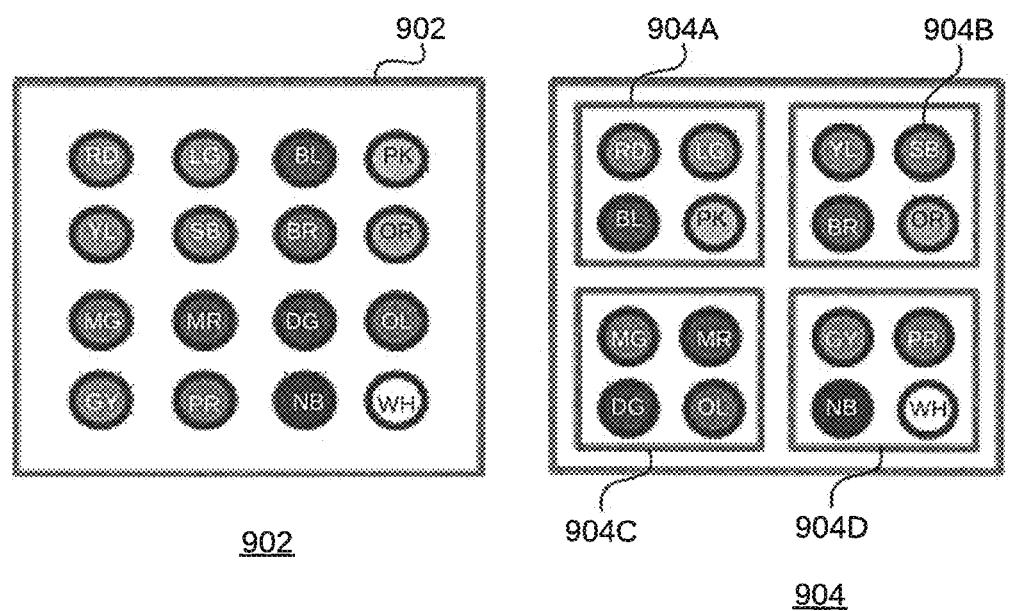
FIG. 9 illustrates a single-symbol transmission per frame and a multi-symbol transmission per frame, in accordance with some embodiments of the present disclosure.

Referring now to FIG. 9, a single-symbol transmission color matrix per frame 902 and a multi-symbol transmission color matrix per frame 904 is illustrated. It may be noted that similar to Case 1, under unfavorable conditions, a single transmit frame including one symbol may be divided into 4 symbols (904A, 904B, 904C, 904D). At the receiver, the received frame may be divided into four frames, and each individual frame may be decoded separately. Under compute resource constraint scenario at the receiver side, for higher frame rates, above a threshold $F_T$, single-symbol transmission may be preferred, as explained in the Case 1.

Core Affinity

As will be appreciated by those skilled in that art, in decoding a transmit frame including four symbols of 125 characters each at the receiver, the individual symbols may be cropped from the frame. The decoding may further include multi-threading, where 4 threads may be created, followed by decoding of each symbol. It may be understood that this may cause load on the CPU. In such cases, as per some embodiments, more than one cores may be assigned to the process where the threads are running. This process may be called CPU pinning. As per CPU pinning, a command Iscpu may give information about the CPU architecture. An exemplary Iscpu information 1000 is illustrated in FIG. 10.

The CPU architecture information may be gathered from sysfs and /proc/cpuinfo. The information may further include a number of CPUs, threads, cores, sockets, Non-Uniform Memory Access (NUMA) nodes, etc. The information may further include information about the CPU caches and cache sharing, family, model, bogoMIPS, byte order, and stepping.

Once the number of cores present is determined, the cores may be assigned to the process using command taskset. The taskset command may be used to set or retrieve the CPU affinity of a running process given its pid. Alternatively, the taskset command may be used to launch a new command with a given CPU affinity. The CPU affinity is a scheduler property that "bonds" a process to a given set of CPUs on the system. An exemplary usage of the taskset command is given below:

taskset –cp 0,4<pid> [pid—process id]
taskset –p 0x11<pid>[11—00010001, Hence enabling $0^{th}$ and $4^{th}$ core]

Figures 11, 12:
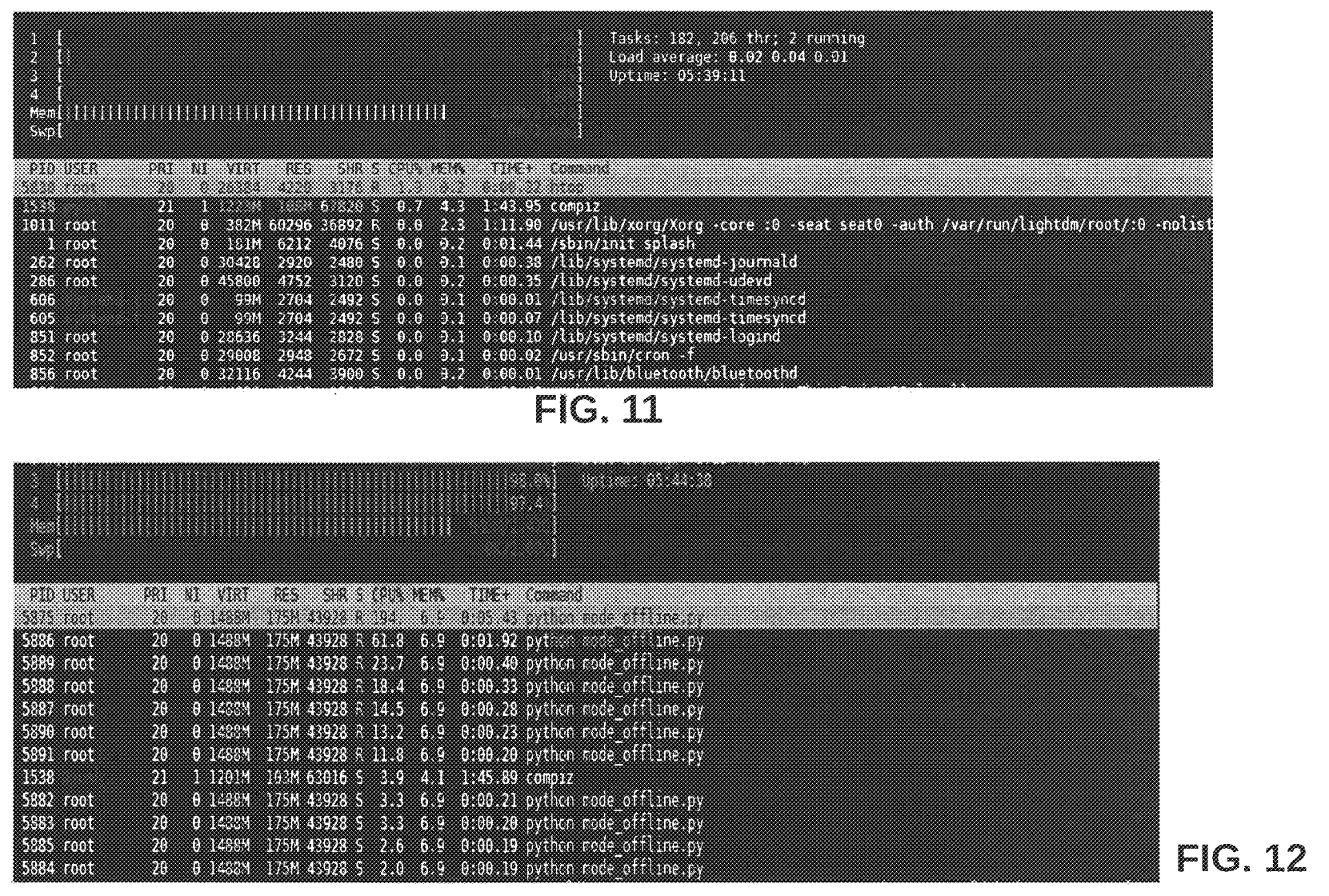

Referring now to FIG. 11 an exemplary htop GUI (view) is shown. As shown in the FIG. 11, two threads may run per core. Accordingly, for 4 threads operating at a time, it may be optimal to assign 2 cores. As it will be appreciated, htop is an interactive process viewer. It is similar to top, but may additionally allow scrolling vertically and horizontally, thereby allowing viewing of all the processes running on the system, along with their full command lines. The htop may further enable viewing of the processes as a process tree, selecting multiple processes, and acting on them all at once. FIG. 12 shows an exemplary htop GUI (view) for assigning of cores to the process. As shown in FIG. 3, core 3 and core 4 may be assigned to the transmit frame decoding process. It may be noted that using the above method, the unused CPU cores are involved in the decoding process. As a result, the CPU resources are utilized effectively, thereby improving the efficiency of the system.

Transmission Rate Adaptation Mechanism

Case 1: OR Code Based Transmitter and Camera Based Receiver

Figure 13:
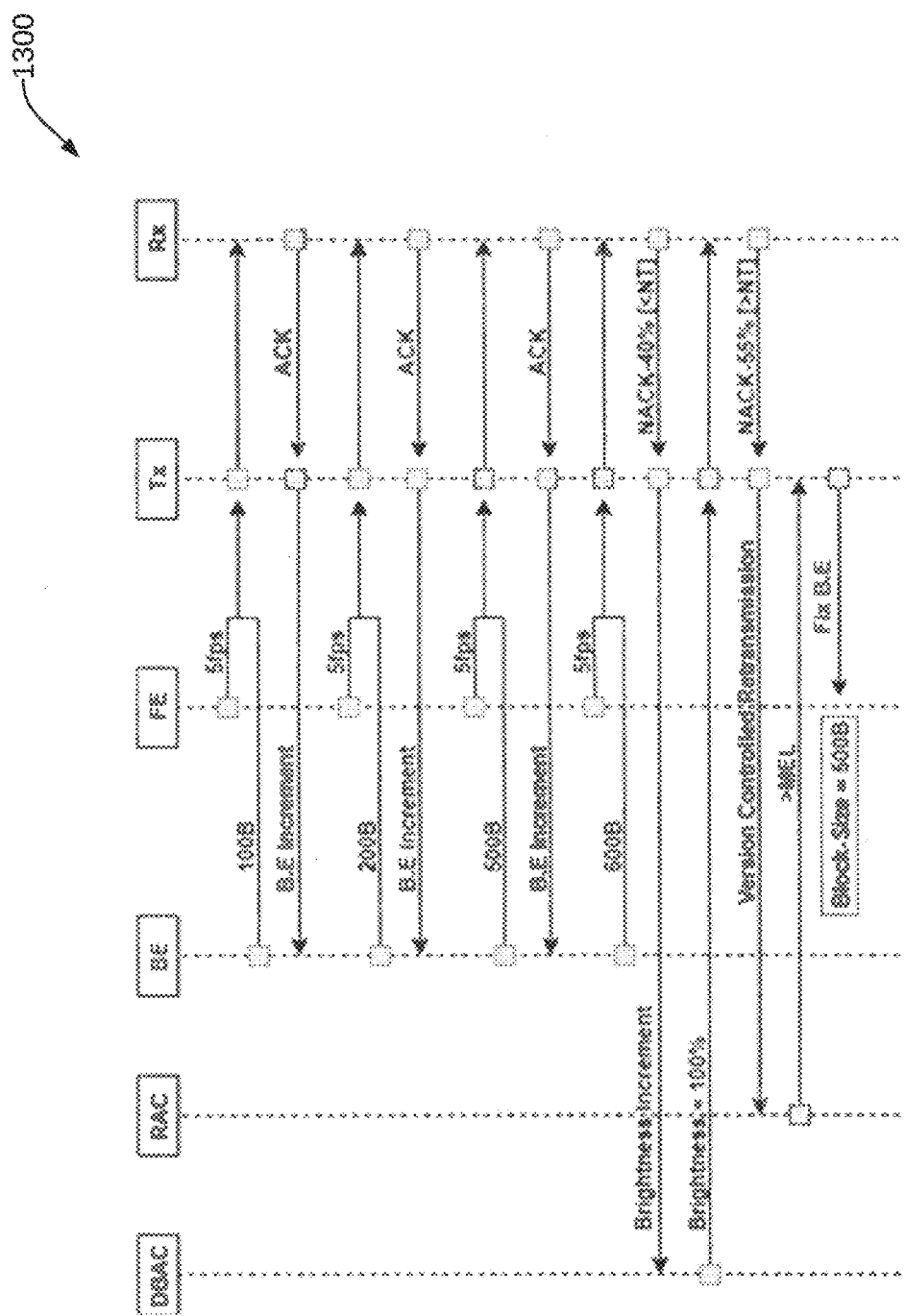
FIG. 13 illustrates an exemplary transmission mechanism with respect to modification in the block size, in accordance with some embodiments of the present disclosure.
Figure 14:
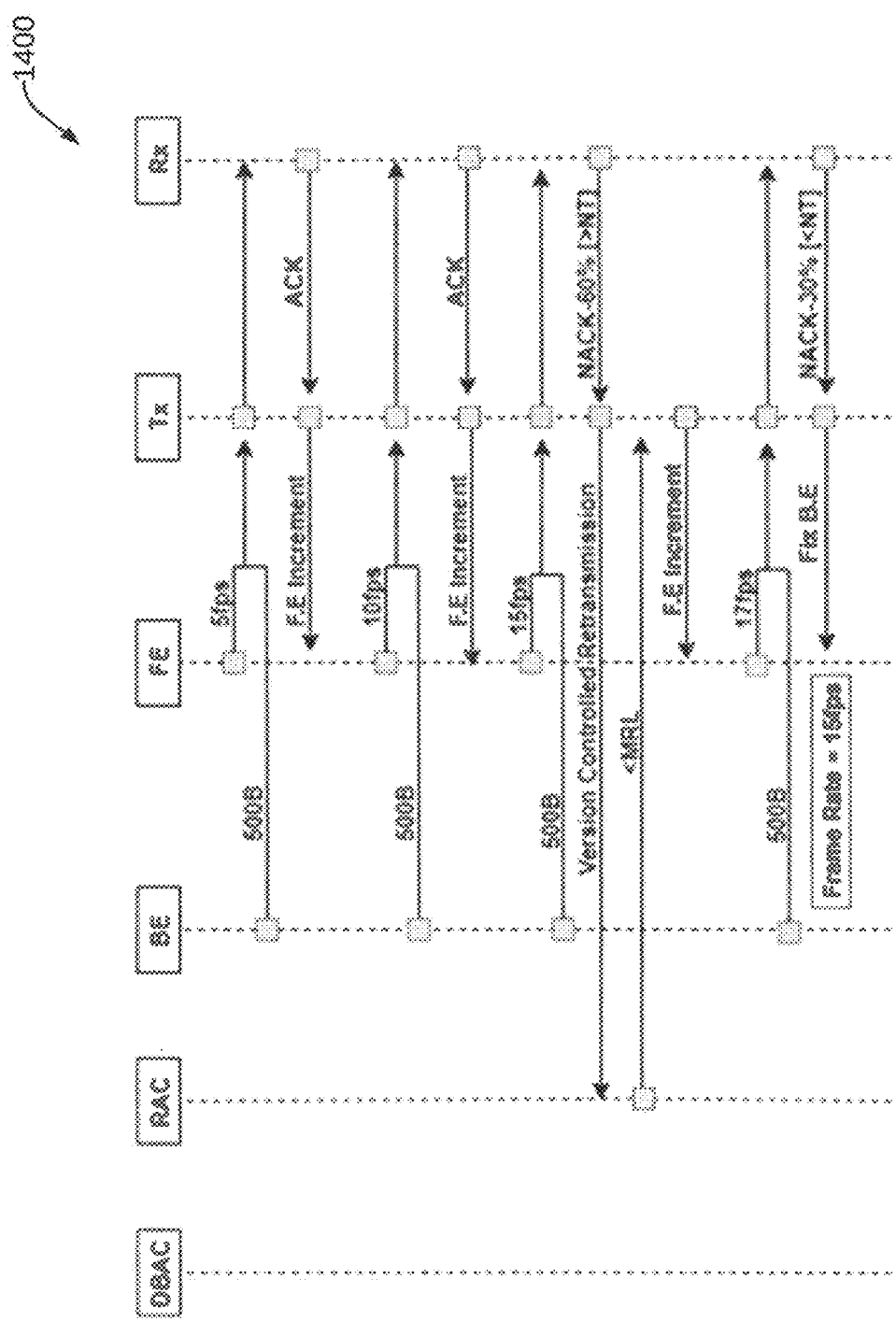
FIG. 14 illustrates an exemplary transmission mechanism with respect to modification in the frame rate, in accordance with some embodiments of the present disclosure.

Referring now to FIG. 13 and FIG. 14, complete transmission mechanisms are illustrated, in accordance with some embodiments. FIG. 13 shows a complete transmission mechanism 1300 according to fixing the block size. The frame rate is set to 1 fps (<$F_T$) by the frame rate estimating module 302, and the display brightness is set to 50%. By way of an example, assuming the buffer may have 5 fragments to transmit, the block size estimating module 310 may fix a block size to 100 characters. To decrease the error propensity, at lower frame rates (<$F_T$), multi-symbol transmission may be carried out, as already explained. The transmit buffer may return 5 fragments, setting the size of each fragment to 100 Bytes, which may be then transmitted.

Upon reception, assuming the receiver is able to decode all the fragments successfully, the receiver may send an ACK. Thereupon, the transmitter may request the block size estimating module 310 to increase the block size of the fragments. The buffer may return fragments of size 200 Bytes, which may then be transmitted. As long as the receiver sends ACK, the block size may continuously increased.

By way of an example, assuming the current block size to be 600 Bytes, the receiver may send a NACK. Along with this NACK, the receiver may further send a "NACK Score", indicating the Channel Quality. If the NACK score is below a threshold (<$N_T$), the transmitter may request the display brightness adaptation control module 308 to increase the brightness to 100%. This may increase the optical resolution of the transmit frame. Even after this action, if the NACK score doesn't improve and stays below the threshold (<$N_T$), then the previously recorded block size for which an ACK was received may be fixed. On the other hand, if the NACK score becomes greater than the threshold (≥$N_T$), then the transmitter may request the rate adaptation control module 306 to carry out the VCR, which is explained in detail in the following paragraphs.

After VCR, the rate adaptation control module 306 may send a response to the transmitter indicating the Maximum Error Limit (MEL) status [>MEL, <MEL]. If the response is >MEL, the retransmission may be considered inefficient and the previously recorded block size for which an ACK was received may be fixed. If the response is <MEL, the retransmission may be considered valid, and the transmitter may request for further increasing of the block size of the data fragments.

Referring to FIG. 14, a transmission mechanism 1400 according to fixing the frame rate is illustrated, in accordance with an embodiment. Once the block size is fixed (for example, at 500 Bytes), the transmitter may request for a gradual increase in the frame-rate, in a similar fashion and may fix the frame-rate. It may be noted that for lower frame-rates, multi-symbol transmission may be carried out to decrease the error propensity, and for higher frame-rate, single-symbol transmission may be carried out, as already explained. It may be further noted that with this mechanism, a dynamic rate adaptation can be achieved, by dynamically varying the transmit parameters like block size and frame-rate. Also, power consumption is taken care of by display brightness adaptation control.

Figure 15:
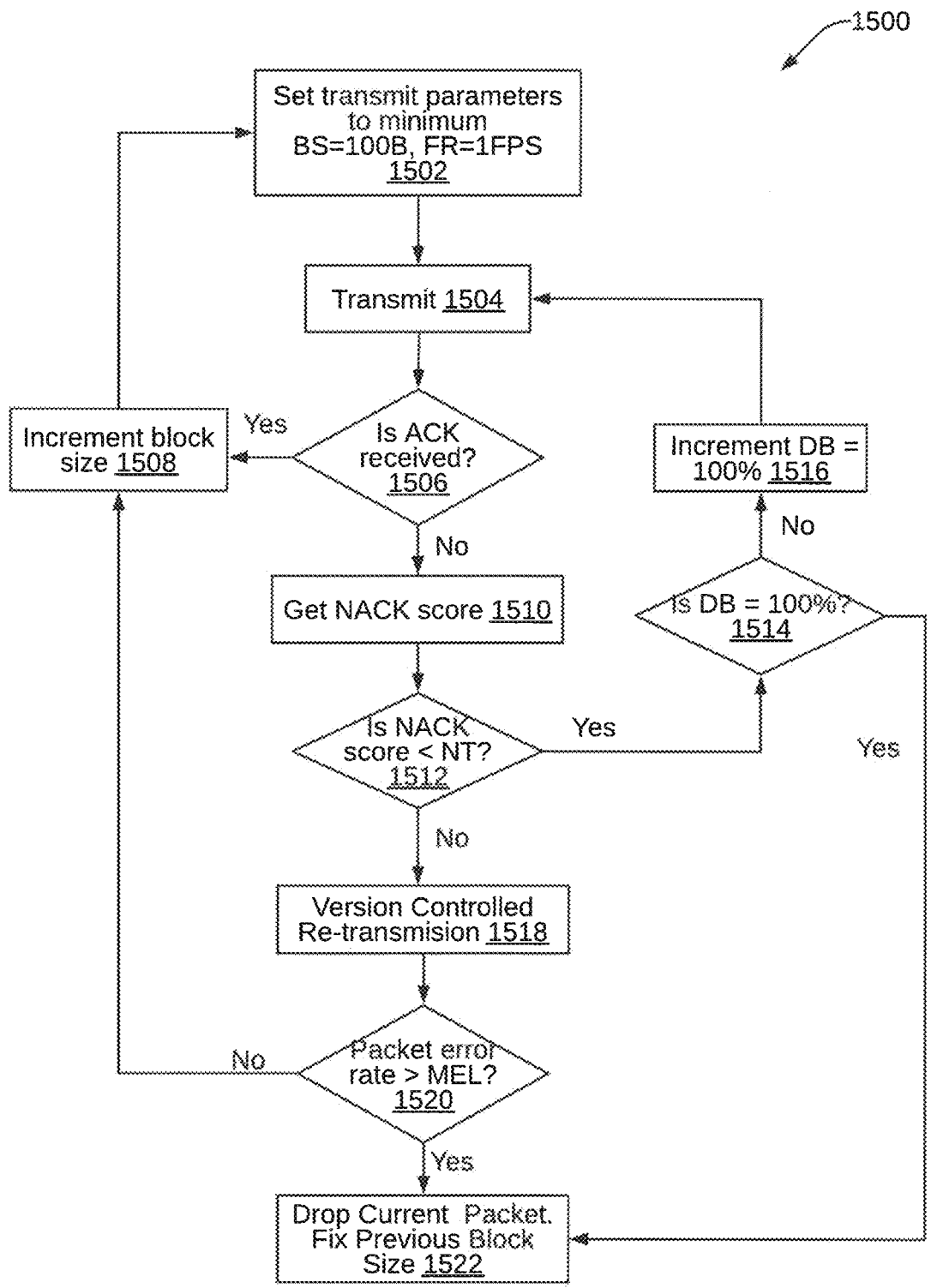
FIG. 15 is a flow diagram of an exemplary method for fixing the block size, in accordance with some embodiments of the present disclosure.

Referring now to FIG. 15, a flow diagram 1500 of a method for fixing the block size is illustrated, in accordance with an embodiment. At step 1502, transmit parameters may be set to minimum. For example, block size may be set at 100 Bytes, and frame rate may be set at 1 frame per second (FPS). At step 1504, transmission may be carried out. At step 1506, a check may be performed to determine if an acknowledgement (ACK) is received or not. If the acknowledgement is received, the method may proceed to step 1508 ("yes" path). At step 1508, the block size may be incremented. The method may once again proceed to step 1502. However, if at step 1506, the acknowledgement is not received, the method may proceed to step 1510 ("No" path). At step 1510, a NACK score may be obtained.

At step 1512, a check may be performed to determine if the NACK score is less than threshold score $N_T$ or not. If the NACK score is less than the threshold score, the method may proceed to step 1514 ("Yes" path). At step 1514, a check may be performed to determine if display brightness (DB) is 100% or not. If the display brightness is 100%, the method may proceed to step 1522 ("Yes" path). At step 1522, the current packet may be dropped, and a previous block size may be fixed. However, if at step 1514, the display brightness is not 100%, the method may proceed to step 1516 ("No" path). At step 1516, the display brightness may be incremented to 100%. The method may then proceed once again to step 1504, to carry out transmission.

Returning back to step 1512, if the NACK score is not less than the threshold score, the method may proceed to step 1518. At step 1518, version controlled re-transmission may be performed. At step 1520, a check may be performed to determine whether packet error rate is greater than MEL. If the packet error rate is greater than the MEL, the method may proceed to step 1522, where the current packet may be dropped, and a previous block size may be fixed. However, if at step 1520, the packet error rate is not greater than the MEL, the method may proceed to step 1508. At step 1508, the block size may be incremented. Thereafter, the method may once again proceed to step 1502.

Figure 16:
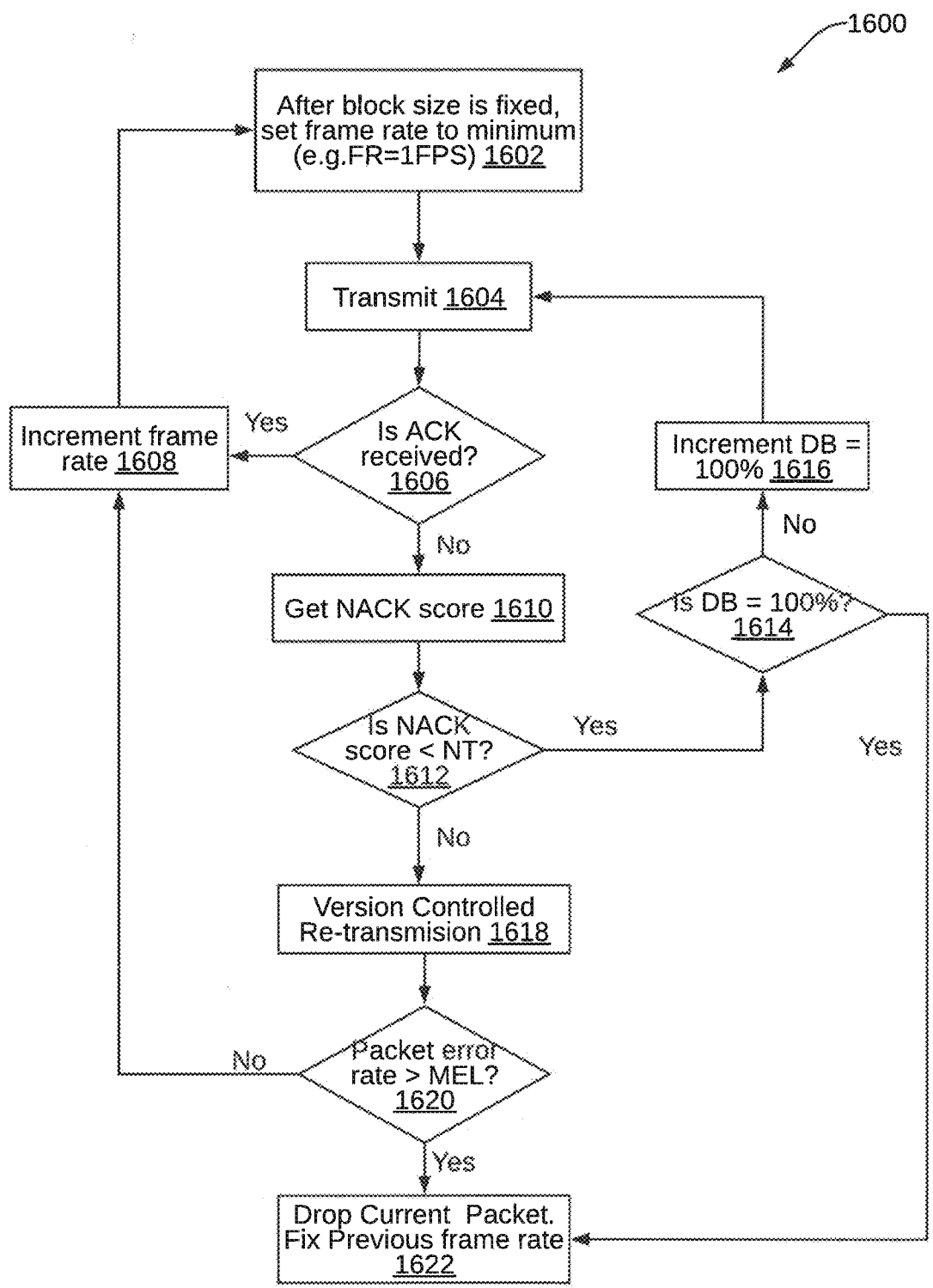
FIG. 16 is a flow diagram of an exemplary method for fixing a frame rate, in accordance with some embodiments of the present disclosure.

Referring now to FIG. 16, a flow diagram 1600 of a method for fixing a frame rate is illustrated, in accordance with an embodiment. At step 1602, after the bock size is fixed the frame rate may be set at minimum. For example, the frame rate may be set at 1 frame per second (FPS). At step 1604, transmission may be carried out. At step 1606, a check may be performed to determine if an acknowledgement (ACK) is received or not. If the acknowledgement is received, the method may proceed to step 1608 ("yes" path). At step 1608, the frame rate may be incremented. The method may once again proceed to step 1602. However, if at step 1606, the acknowledgement is not received, the method may proceed to step 1610 ("No" path). At step 1610, a NACK score may be obtained.

At step 1612, a check may be performed to determine if the NACK score is less than threshold score $N_T$ or not. If the NACK score is less than the threshold score, the method may proceed to step 1614 ("Yes" path). At step 1614, a check may be performed to determine if display brightness is 100% or not. If the display brightness is 100%, the method may proceed to step 1622 ("Yes" path). At step 1622, the current packet may be dropped, and a previous frame rate may be fixed. However, if at step 1614, the display brightness is not 100%, the method may proceed to step 1616 ("No" path). At step 1616, the display brightness may be incremented to 100%. The method may then proceed once again to step 1604, to carry out transmission.

Returning back to step 1612, if the NACK score is not less than the threshold score, the method may proceed to step 1618. At step 1618, version controlled re-transmission may be performed. At step 1620, a check may be performed to determine whether packet error rate is greater than MEL. If the packet error rate is greater than the MEL, the method may proceed to step 1622, where the current packet may be dropped, and a previous frame rate may be fixed. However, if at step 1620, the packet error rate is not greater than the MEL, the method may proceed to step 1608. At step 1608, the frame rate may be incremented. Thereafter, the method may once again proceed to step 1602.

Case 2: Color Matrix Based Transmitter and Camera Based Receiver

It may be noted that unlike in Case 1, in color matrix based transmitter, the transmit area may be fixed. Accordingly, it may be important to fix the orientation of the active LEDs, depending on the media conditions. At the beginning of the transmission, the block size estimating module 310 may set the block size to maximum. Further, the frame rate may be set to minimum, thereby transmitting a "TEST-FRAME". Depending on the successful reception and decoding of information at the receiver, the placement of active LEDs in the fixed transmit area may be decided.

Figure 17:
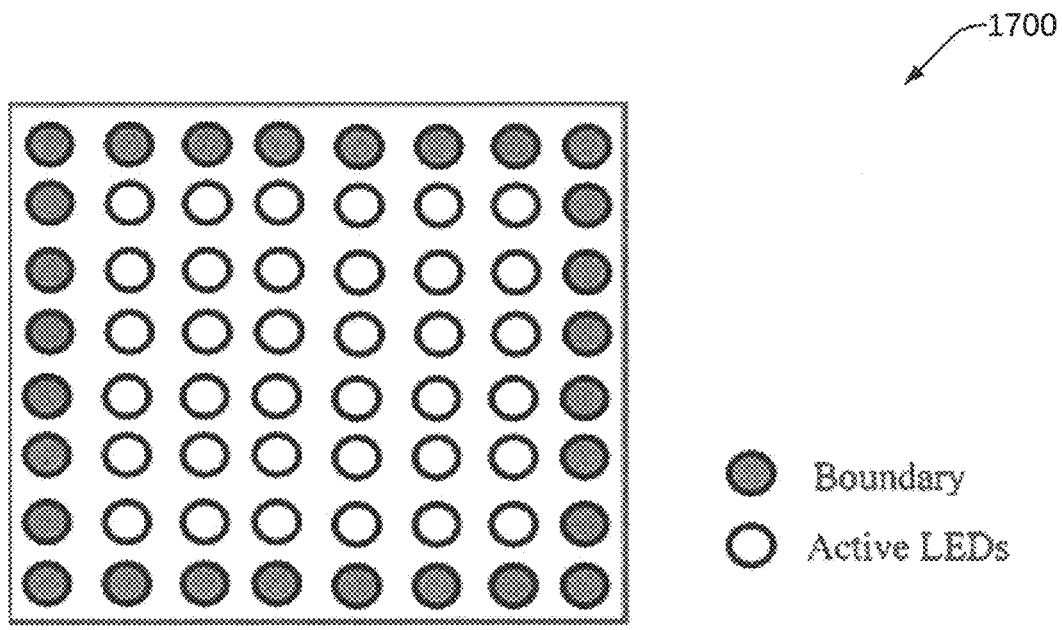
FIG. 17 illustrates an exemplary transmit area of 8*8 LED matrix, in accordance with some embodiments of the present disclosure.

Referring now to FIG. 17, a transmit area of 8*8 LED matrix 1700 is illustrated, in accordance with an embodiment. The outermost layer of the LED matrix may be used as a boundary, by assigning a color which the receiver camera may use to distinguish the LEDs containing the data from the background. The remaining 6*6 LED matrix may be used for transmitting data [Active LEDs].

Figure 18:
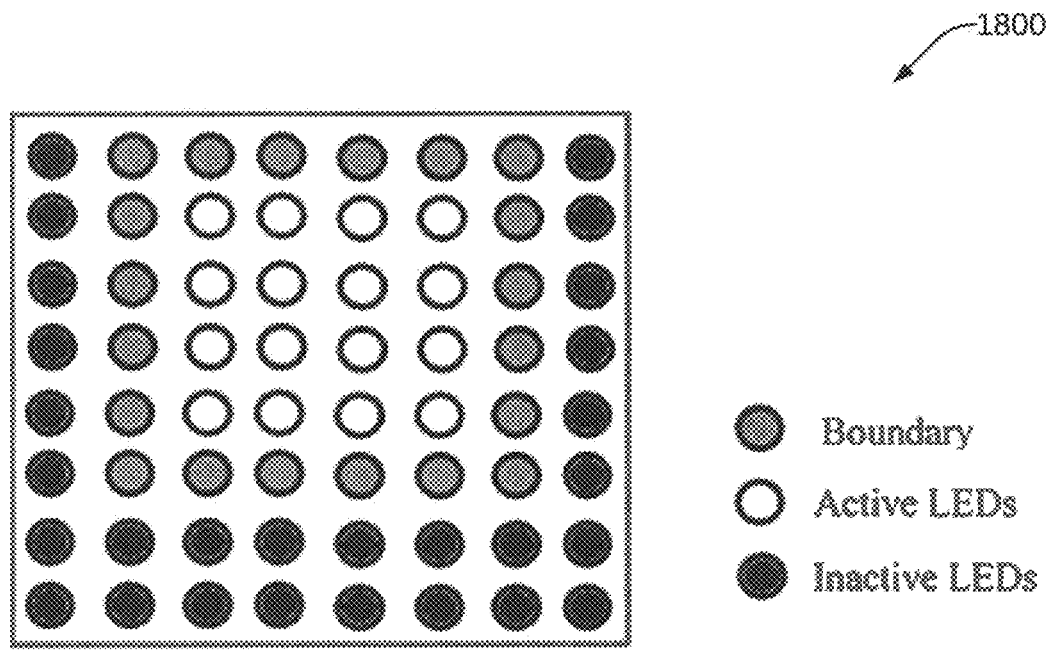
FIG. 18 illustrates an exemplary transmit area of 8*8 LED matrix (re-oriented LEDs), with the block size reduced to 4*4 active LED matrix, in accordance with some embodiments of the present disclosure.

By way of an example, upon decoding the information, it may be found that the lower part of the frame was not clearly captured. In such example, the block size of the transmit frame may be reduced, and the boundary may be shrunk in such a way that the active LEDs containing data are present in the upper part of the transmit frame. As shown in FIG. 18 (Active LEDs reoriented), the block size may be reduced to 4*4 active LED matrix 1800, with an outer boundary, making the rest of the LEDs inactive. It may be noted that with the orientation of the active LEDs known, the transmission mechanism may be carried out.

Figure 19:
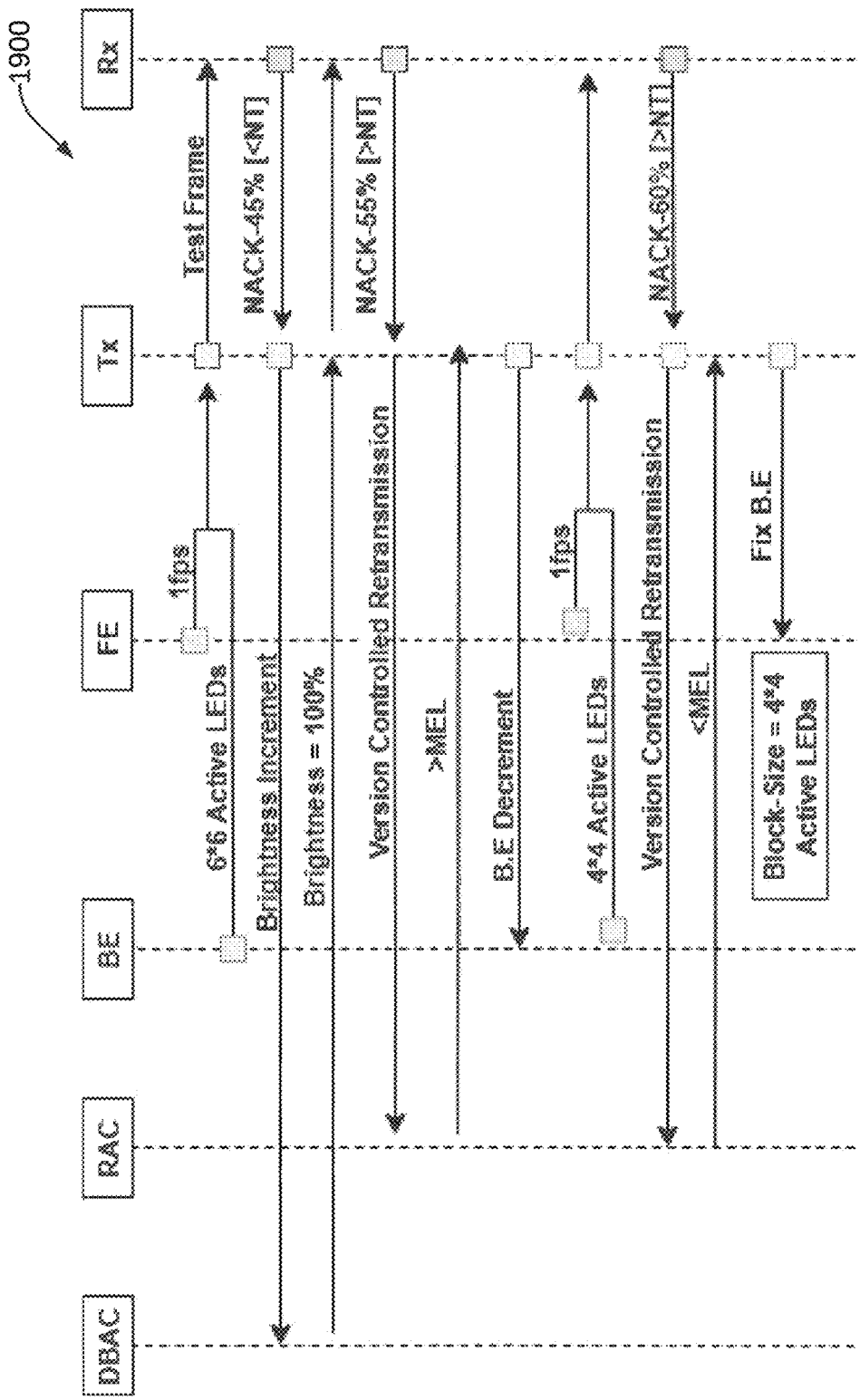
FIG. 19 illustrates an exemplary transmission mechanism for fixing the block size, in accordance with some embodiments of the present disclosure.

Referring now to FIG. 19, an exemplary transmission mechanism 1900 for fixing the block size is illustrated, in accordance with an embodiment. In the Case 2 (using LED matrix), since the transmit area is fixed, the block size may be kept maximum, using all the LEDs in the matrix surrounded by the boundary. This frame may be called "Test Frame", since the response from the receiver may help the transmitter to determine the active LEDs' further effective data transmission.

If the receiver sends an ACK, then the block size may be set to maximum, in this example (6*6 active LEDs). If the receiver sends a NACK, the NACK score may be first analyzed. If the NACK Score is below the threshold (<$N_T$), the transmitter may request the display brightness adaptation control module 308 to increase the brightness to 100% which increases the clarity of the transmit frame and improves the decoding ability of the receiver. Even after this action, if the NACK score doesn't improve and stays below the threshold (<$N_T$), then the previously recorded block size for which an ACK was received may be fixed. On the other hand, if the NACK score is greater than the threshold (>$N_T$), then the transmitter may request the rate adaptation control module 306 to carry out the VCR.

If the VCR response is >MEL, the transmitter application may request the block size estimating module 310 to decrease the block size, making the active LEDs to 4*4. This procedure may be repeated until the VCR sends a positive response [<MEL]. This way, the block size is fixed in case of LED based transmitter.

Information Rate Control

Figure 20:
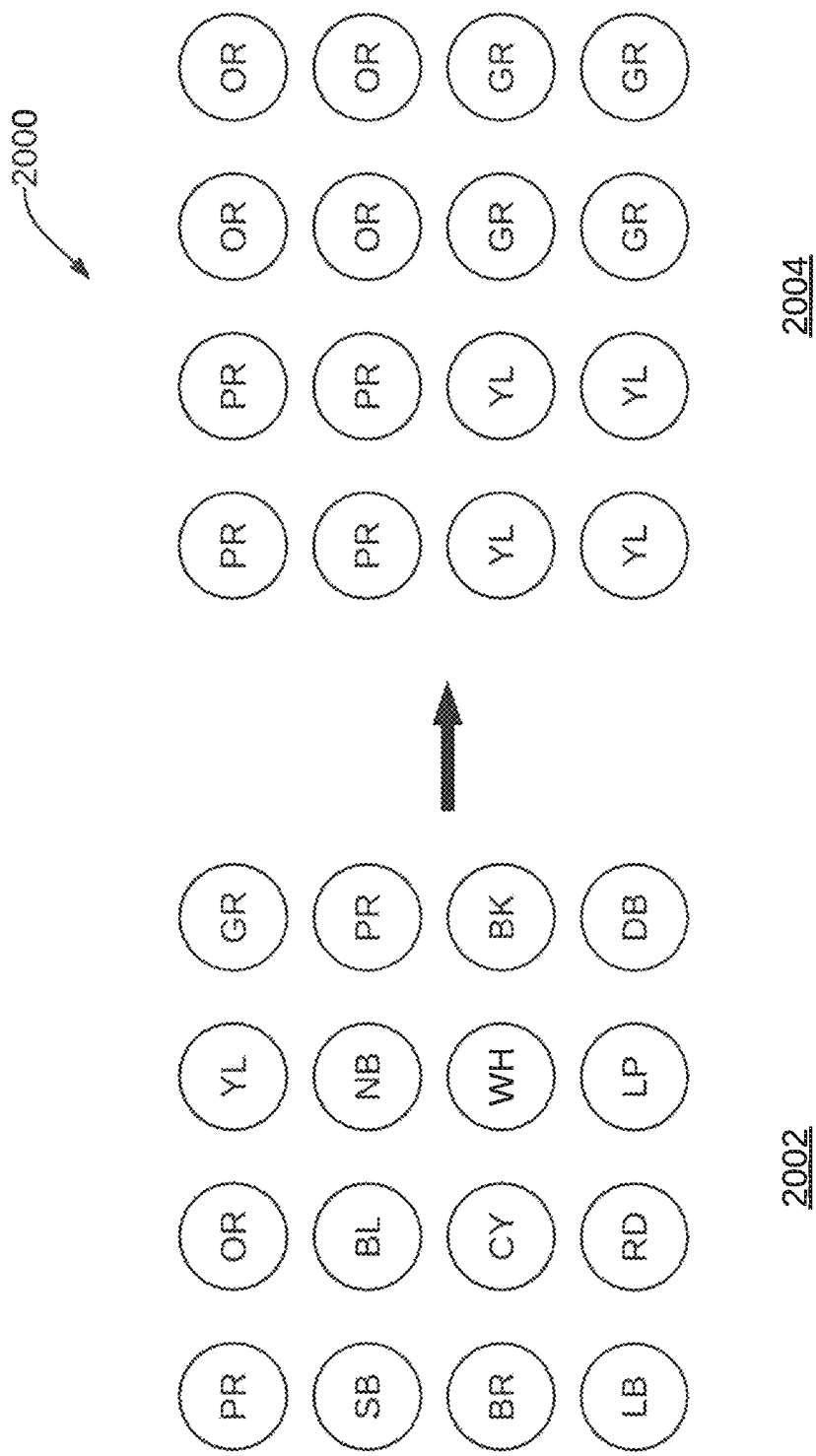
FIG. 20 illustrates an exemplary process of reducing information rate, in accordance with some embodiments of the present disclosure.

Referring now to FIG. 20, a process 2000 of reducing information rate is illustrated, in accordance with an embodiment. The information rate may be reduced by reducing the color space and transmitting the same color into multiple blocks of LEDs. If the receiver camera is unable to distinguish the special separation between the adjacent LEDs in the transmit frame 2002 even after the camera magnification, the information rate may be decreased by encoding the same color into blocks of LEDs, as shown in 2004. This may enable the camera to distinguish the colors in the frame easily.

By way of example, as illustrated, the transmit frame 2002 frame includes sixteen LEDs of different colors including Purple (PR), Orange (OR), Yellow (YL), Green (GR), Sky Blue (SB), Blue (BL), Navy Blue (NB), Purple (PR), Brown (BR), Cyan (CY), White (WH), Black (BK), Light Blue (LB), Red (RD), Light Purple (LP), and Dark Blue (DB). Further, the transmit frame 2004 with the information rate decreased by encoding same color into blocks of LEDs include sixteen LEDs including four Purple (PR), four Orange (OR), four yellow (YL), and four Green (GR).

Version Controlled Retransmission

Figure 21:
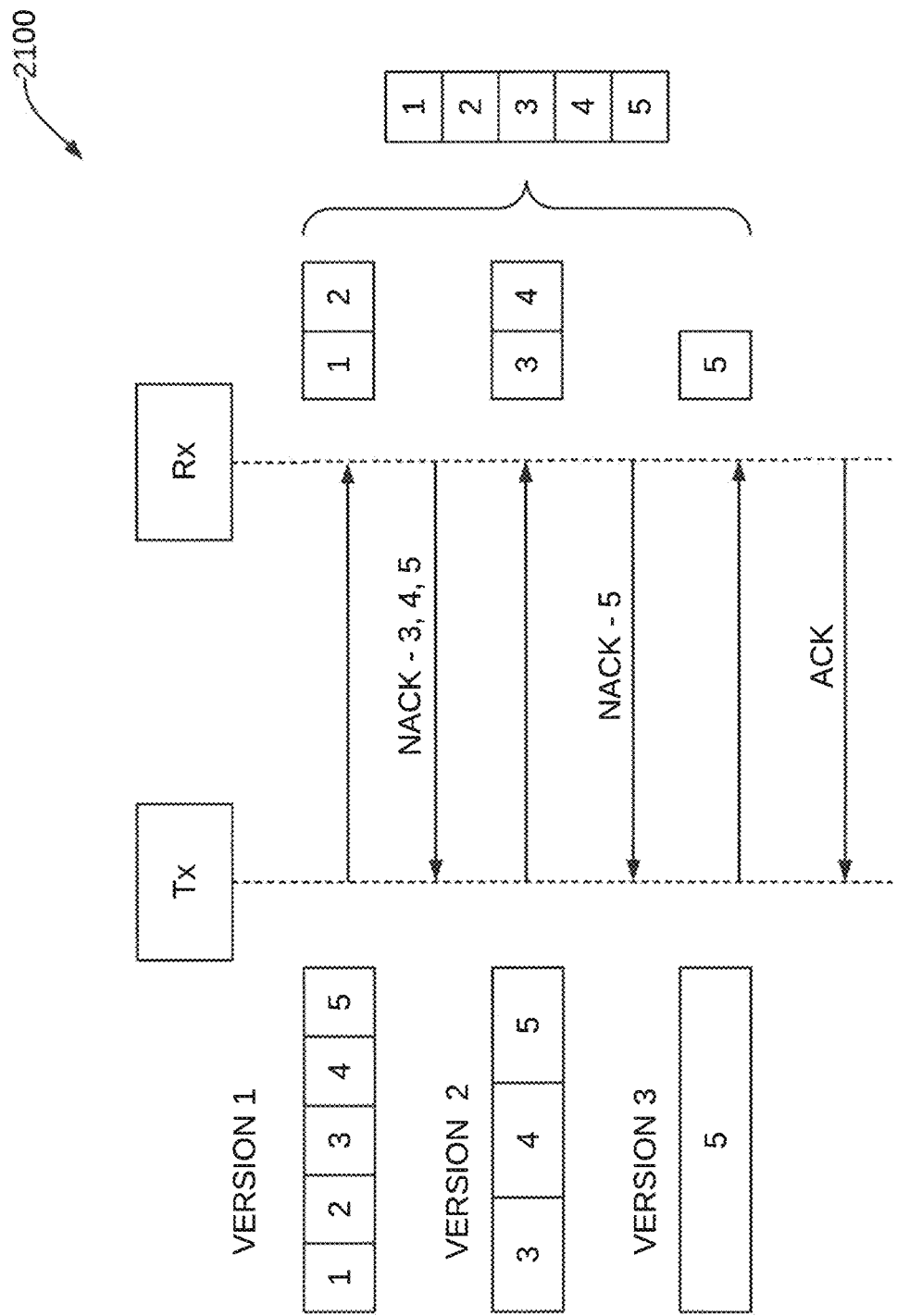
FIG. 21 is a flow diagram of a version-controlled re-transmission, in accordance with some embodiments of the present disclosure.

Referring now to FIG. 21, a flow diagram of a version controlled re-transmission 2100 is illustrated, in accordance with an embodiment. Once NACK is received from the receiver (Rx) along with the Channel Quality Indication [CQI] or NACK score, the score may be first evaluated. If the score is too less (below the threshold [$N_T$]), then the transmitter may request the block size estimating module 310 to fix the previously recorded block size, for which there was an ACK, and may further increase the frame rate with constant block size. On the other hand, if the NACK score is above the threshold, the transmitter may request the rate adaptation control module 306 for a VCR.

To initiate the transmission, the transmitter may send first version [Version 1] of the data fragments, for example, in the order [1-2-3-4-5]. At the receiver, there may be a loss of fragments and only [1-2] fragments may be received. Analysis of the order of reception of the fragments and creation of a newer version may be performed dynamically. In the previous version, as only the first few fragments are received, in the next version, the order of the fragments may be changed such that missing fragments may be placed in the beginning indices, which may result in the order [3-4-5-{ }-{ }]. As [1-2] are already received successfully in the previous transmission, [1-2] may not be pushed into re-transmission buffer in the newer version, so as to avoid redundancy. Instead, the duty cycle of the missing fragments may be increased, which may further increase the probability of successful retransmission.

The missing fragments that can be placed in the remaining two indices may be either of [3, 4, 5]. Since [3,4] are in the initial indices and are more probable to be successfully transmitted (according to the version transmitted in the previous transmission), the duty cycle of the fragment [5] may be increased, to complete the version 2 of the transmit buffer [3-4-5-5-5]. This version may not only promise successful transmission of [3-4], but may also increase probability of successful transmission of [5]. If the fragment [5] fails to be transmitted successfully, in the next version, the lost fragment [5] may be placed in the initial index, as well as in the remaining indices, which may look like [5-5-5-5-5].

If there is a failure in further transmitting any of the fragments, in the next version of the transmit buffer, the duty cycle of the fragment may be increased and transmitted. Once this version is sent, there may be a high chance of receiving missing fragments successfully. Now, an ACK may be received from the receiver, indicating that all the fragments have been successfully transmitted and received. Once the ACK is received from the receiver, a set of state parameters may be recorded. These set of state parameters may include a number of retransmissions, buffer size and frame rate at which it was transmitted. By way of an example, the state parameters and their associated values may be as follows:

| Number of re-transmissions | 3 |
|---|---|
| Buffer size | 5 |

It may be noted that for an efficient retransmission, packet error rate should be minimum. To conclude on the validity of the retransmission, first the packet error rate of the VCR may be calculated. This packet error rate may be compared with MEL. If the packet error rate is greater than MEL, the rate adaptation control module 306 may send the ">MEL" signal to the transmitter, which may indicate that the retransmission is not efficient for the corresponding block size. The transmitter may then request the block size estimating module 310 to fix the previously recorded block size for which an ACK was received. On the other hand, if the number of retransmissions is less than MEL, the rate adaptation control module 306 may send the "<MEL" signal to the transmitter, indicating that retransmission could be considered valid. The transmitter may then request the block size estimating module 310 to further increase the block size.

Maximum Error Limit (MEL)

The MEL may be set based on the channel quality indication present in the NACK score. This score may indicate what packet error rate is currently being faced, and may apply the same as the MEL. The packet error rate of the overall VCR may be compared with this MEL and then the retransmission validity may be evaluated.

For example, the transmission buffer may have five fragments, 20 Bytes each. Accordingly, the transmission buffer may now hold 100 Bytes, ready to be transmitted. After the transmission, it is found that 20% of the packets is lost, giving a NACK score of 80, thereby setting MEL to 20. This may trigger a VCR with the lost fragments transferred to the re-transmission buffer. If the packet error rate of the overall retransmission is within 20%, the re-transmission may be considered valid and the rate adaptation control module 306 may send the "<MEL" signal to the transmitter indicating that retransmission could be considered valid. Further, the transmitter may then request the block size estimating module 310 to further increase the block size. On the other hand, if the packet error rate exceeds 20%, the rate adaptation control module 306 may send the ">MEL" signal to the transmitter, which indicates that the retransmission is not efficient for the corresponding block size. The transmitter may then request the block size estimating module 310 to fix the previously recorded block size for which an ACK was received.

Ambient Illumination Detection

Figure 22:
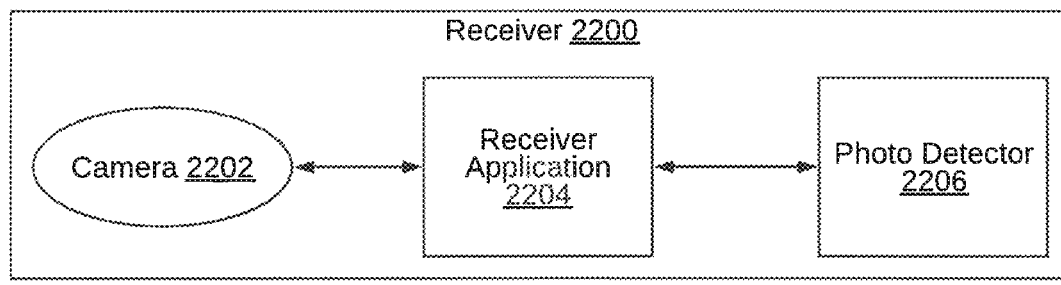
FIG. 22 is a block diagram of an exemplary receiver, in accordance with some embodiments of the present disclosure.

Referring now to FIG. 22, a block diagram of a receiver is illustrated, in accordance with an embodiment. The receiver may include a camera 2202, a receiver application 2204, and photodetector 2206. It may be noted that a rate limiting mechanism may estimate an illumination level in the media and control transmit parameters. The channel conditions may be continuously monitored and the gradient of the variation in the background illumination may be determined. This gradient may be communicated back to the transmitter to adapt the rate to dynamic channel conditions.

Figure 23:
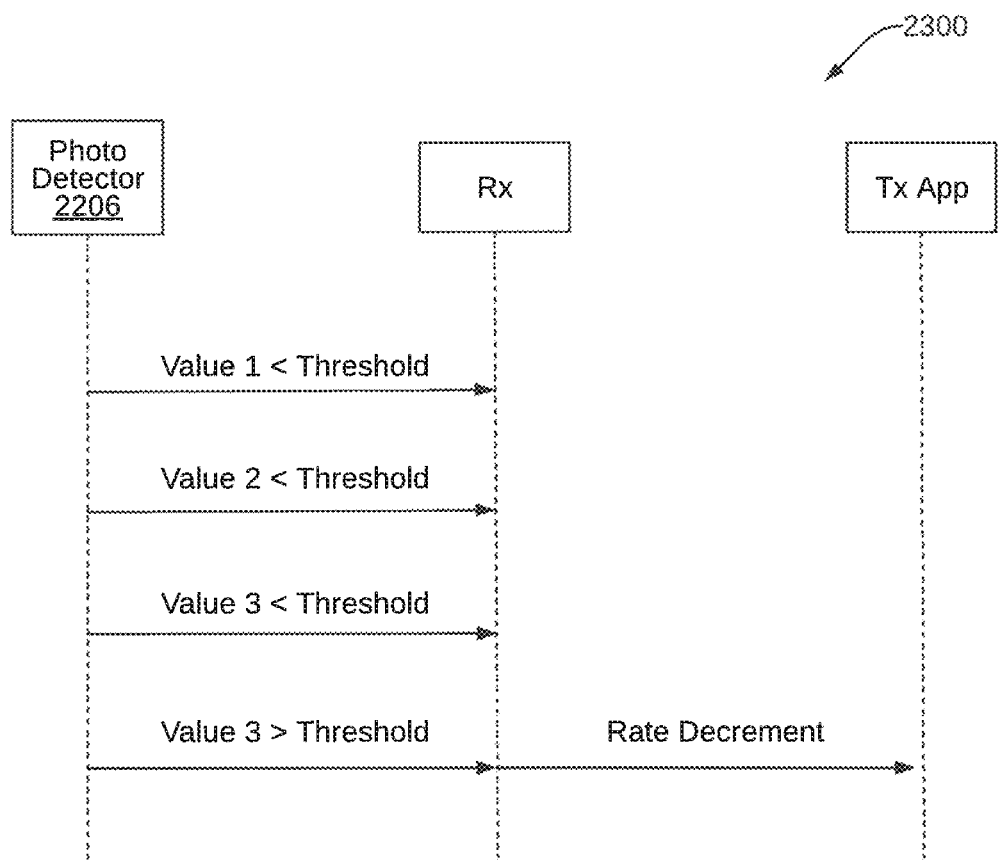
FIG. 23 illustrates a sequence of ambient illumination detection, in accordance with some embodiments of the present disclosure.

FIG. 23 illustrates a sequence of ambient illumination detection 2300, in accordance with an embodiment. The photodetector 2206 may periodically return the background illumination value to the receiver application 2204. If this value exceeds beyond a threshold, indicating the channel condition has worsened, the receiver application 2204 may communicate this value back to the transmitter. The transmitter may then slow down the rate, thereby adapting to the media conditions.

Transmit Frame Identification

It may be noted that due to the varying distance between the transmitter and the camera, the size of the transmit frame in the receiver image may vary. When the distance increases, the size of the transmit frame in the receiver image may decrease, thereby deteriorating the ability of the camera to identify the object.

In accordance with some embodiments, the transmitted frame may be correctly extracted by introducing a concept of guard band in the form of a colored boundary. As a result the noise around the transmit frame may be eliminated with minimum processing time. This method may be implemented and tested with results for a screen-based transmitter and camera-based receiver.

Case 1: QR Code Based Transmitter and Camera Based Receiver

It may be noted that transmit frame identification of the QR code based transmitter may be performed with finder patterns present as a part of the QR code. The finder patterns may be present at three corners of the QR code, of size 7×7 modules each. Additionally, there may be a number of alignment patterns depending on the version of the QR code, and timing patterns, which may help the receiver camera to understand orientation and version of the QR code transmitted.

Case 2: Color Matrix Based Transmitter and Camera Based Receiver

Figure 24:
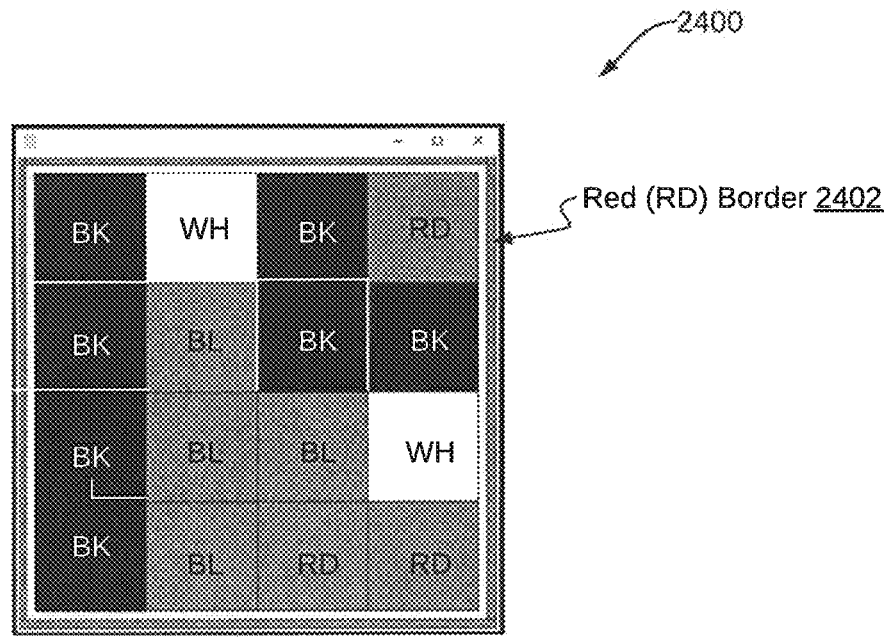
FIG. 24 illustrates an exemplary transmit frame with surrounding "RED" border, in accordance with some embodiments of the present disclosure.

In order to identify the transmit frame in the receiver image, at the transmitter side, the transmit frame may be surrounded with a border of "RED" color, which may serve as a guard band, as shown in FIG. 24.

Referring now to FIG. 24, an exemplary transmit frame 2400 with surrounding "RED" border 2402 is illustrated. The border containing red color may have HSV values [255, 0, 0]. In order to extract the frame, the following operations may be performed on the border:

(i) As any image is basically a 3D matrix, containing the matrix for Red, Green and Blue, from the received image, the 1D matrix of Red may be extracted and the other 2 matrices may be made 0.

(ii) The 1D matrix may include the red component value of all the pixels in the image. In this 1D matrix, the red component value corresponding to the border may be close to 255.

(iii) The image threshold operation may be performed, limiting the value of the red component in this 1D matrix to '220'.

(iv) The pixels with red component less than '220' may be eliminated, thereby reducing most of the noise in the image.

(v) Once the noise around the transmit frame is eliminated, edge detection may be performed on the resultant image, to extract the transmit frame from the received image.

Proving SNR by Transmit Frame Skew Correction

Figure 25:
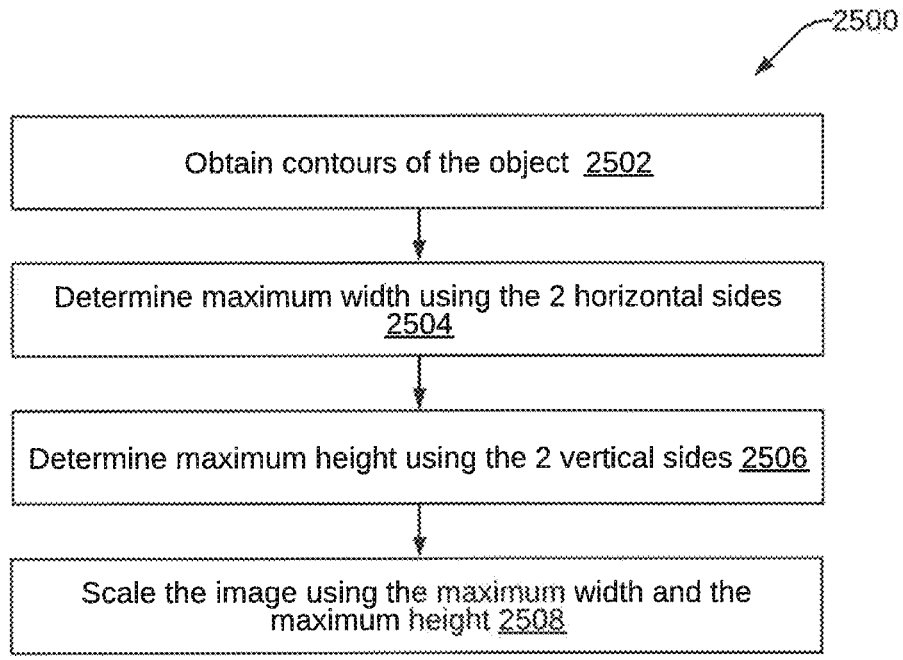
FIG. 25 is a flow diagram of an exemplary method of improving SNR by transmit frame skew correction, in accordance with some embodiments of the present disclosure.

Once the image of the transmit frame is captured by the receiver camera, and the noise is eliminated using the guard band, there may be signal impairment due to tilted camera capture. The SNR may be improved by correcting the signal impairment caused due to the deviated capture by the receiver camera with respect to the transmitter, Referring now to FIG. 25, a flow diagram 2500 of a method of improving SNR by transmit frame skew correction is illustrated, in accordance with an embodiment. It may be noted that the transmit frame in the captured image may be skewed due to the tilted angle of the capture by the receiver camera. Once the contours of the transmit frame are extracted from shape detection, the contours may be sent for skew correction.

At step 2502, contours of the object may be obtained using shape detection. In some embodiments, 2D perspective transformation may be performed on the object extracted. At step 2504, maximum width may be determined using the 2 horizontal sides. The maximum width of the object may be used to obtain the scaling factor. At step 2506, maximum height may be determined using the 2 vertical sides. At step 2508, the image may be scaled using the maximum width and the maximum height.

Transmit Frame Magnification:

It may be noted that even by detecting transmit frame boundary using image processing algorithms, information in the transmit frame might not be decoded. This may be due to the camera's inability to distinguish different colors in smaller size of the transmit frame, or due to the reduced spatial separation of the color patterns in the transmit frame. Therefore, before the transmit frame boundary is arrested, the camera zoom-in feature may be used to magnify the transmit frame, and increase optical resolution.

Figure 26:
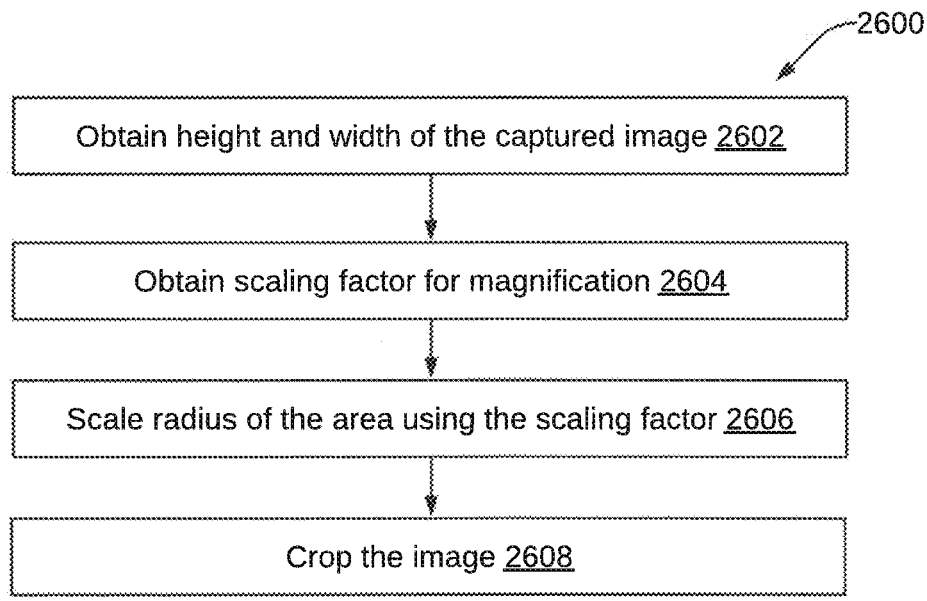
FIG. 26 is a flow diagram of an exemplary method of transmit frame magnification, in accordance with some embodiments of the present disclosure.

Referring now to FIG. 26, a flow diagram 2600 of a method of transmitting frame magnification is illustrated, in accordance with an embodiment. At step 2602, height and width of the captured image may be obtained. At step 2604, scaling factor for magnification (scale) may be obtained. The scaling factor may decide the amount of zooming of the receiver camera. At step 2606, radius of the area may be scaled using this scaling factor. The following relation may be applied:

$$Radius\_x = Scale * height/100$$

$$Radius\_y = Scale * width/100$$

At step 2608, the image be cropped using the estimated scaled coordinates centre, radius_x, and radius_y.

Effective Utilization of Transmission Buffer

As will be appreciated, the efficiency of the transmission process may be dependent on number of WRITE operations. The WRITE operations may be expensive operations on the CPU time. A buffering technique may be used to minimize the number of WRITE operations for improving efficiency in the transmission process. In some embodiments, contiguous memory blocks may be created with each block having size of least denomination. One or more pointers may be allocated to each block. As the transmission opportunity changes due to change in the channel conditions, required block size may be effectively delivered, that may improve performance of the transmission process.

Figure 27:
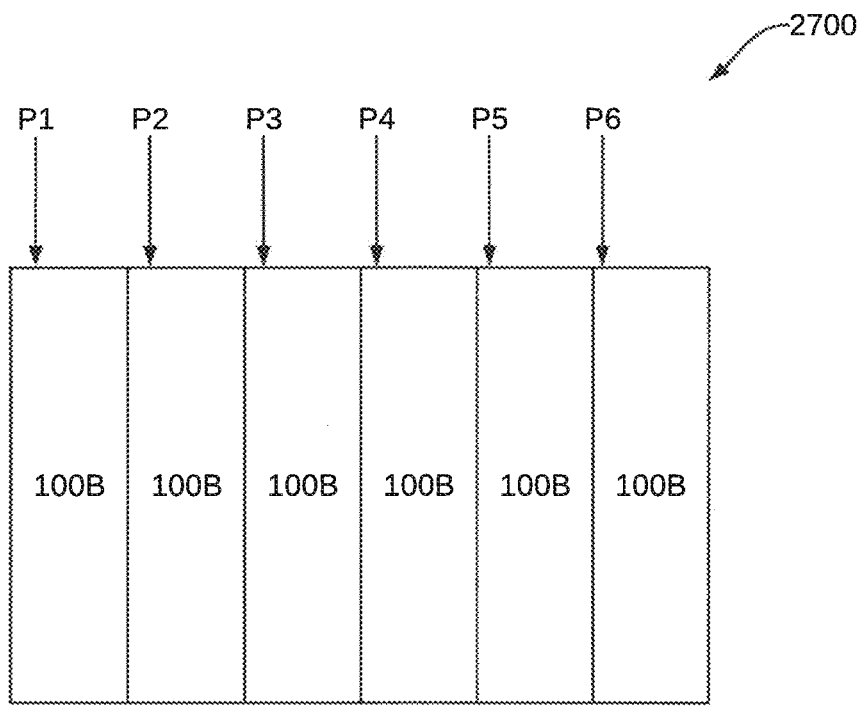
FIG. 27 illustrates an arrangement of contiguous memory blocks with pointers, in accordance with some embodiments of the present disclosure.

Referring now to FIG. 27, an arrangement of the contiguous memory blocks with pointers 2700 is illustrated, in accordance with an embodiment. As shown in the FIG. 27, one or more blocks of 100 Bytes may be created, assuming 100 Bytes is the lowest denomination to the transmitted. Each block of 100B may be assigned a pointer [P1, P2, P3, and so on]. If block size requirement is 100 Bytes, then initial and final pointers will be P1 and P2, thereby allocating 100 Bytes of information to the data encoder. If the requirement changes to 200 Bytes, the initial and final pointers P1 and P3 may be returned.

Knowledge Building Model

As it will be appreciated, as the communication channel conditions change dynamically, it may be necessary to decide on the data rate intelligently, by execution of the adaptation algorithm. Accordingly, as and when an ACK/NACK is received, a configuration data may be noted and stored in a dataset. For example, the database may include the parameters of frame rate, block size, display brightness, ACK/NACK, NACK SCORE, and VCR Response [<MEL/>MEL].

A model may be built and trained using this dataset. The model may learn the configuration after a set of executions of the algorithm. If the error rate increases and the NACK score decreases, the algorithm may be executed all over again for efficiency. In order to save time, the block size and frame rate may be fixed based on the prediction by the model, using NACK Score and VCR Response. The model may be used to predict distance between the transmitter and the receiver.

It may be noted that the current model may be built at the receiver, and may be applied in the context of historical knowledge building model for rate adaptation at the access point, where diverse type for users may be coming in the vicinity of communication. By creating a knowledge bank based on the historical adaptation rate (rather than a blind attempt), an initialization vector can be created, based on the knowledge database.

As will be appreciated by one skilled in the art, a variety of processes may be employed for improving efficiency of optical camera communication (OCC) between OCC devices. For example, the exemplary OCC system 200 and the associated rate adaptation control module 300 may improve efficiency of a bi-directional OCC between a first OCC device and a second OCC device by the processes discussed herein. In particular, as will be appreciated by those of ordinary skill in the art, control logic and/or automated routines for performing the techniques and steps described herein may be implemented by the OCC system 200 and the associated rate adaptation control module 300, either by hardware, software, or combinations of hardware and software. For example, suitable code may be accessed and executed by the one or more processors on the OCC system 200 to perform some or all of the techniques described herein. Similarly, application specific integrated circuits (ASICs) configured to perform some or all of the processes described herein may be included in the one or more processors on the OCC system 200.

For example, referring now to FIG. 28, an exemplary process 2800 for improving efficiency of a bi-directional OCC between a first OCC device and a second OCC device is illustrated, in accordance with some embodiments of the present disclosure. As illustrated, the process 2800 may include the step of estimating, by the first OCC device comprising a first display device and a first camera device, at least one first transmission parameter with respect to the first display device and at least one first reception parameter with respect to the first camera device at step 2802. It should be noted that the at least one first reception parameter may be based on at least one second transmission parameter of a second OCC device or at least one channel condition parameter. Additionally, it should be noted that the at least one second transmission parameter may be derived from an analysis of information captured by the second OCC device from the first OCC device. The process 2800 may further include the step of dynamically modifying, by the first OCC device, the at least one first transmission parameter based on the at least one first reception parameter in order to maximize throughput of OCC at step 2804. In some embodiments, the process 2800 may further include the step of creating a knowledge building model to predict the at least one first transmission parameter based on historical knowledge.

In some embodiments, the at least one first transmission parameter may include a frame rate parameter of the first display device. In such embodiments, the process 2800 may include the steps of estimating and modifying the frame rate parameter of the first display device based on the at least one first reception parameter. It should be noted that, in some embodiments, the at least one first reception parameter may be determined upon successful reception, by the first camera device, of an OCC packet transmitted from the second OCC device.

Similarly, in some embodiments, the at least one first transmission parameter may include a block size of a transmission packet to be displayed by the first display device. In such embodiments, the process 2800 may include the steps of estimating and modifying the block size of the transmission packet to be displayed by the first display device based on a predetermined specification of an application transmitting data. Additionally, in such embodiments, modifying the block size may include the step of creating contiguous memory blocks having block size of a predetermined denomination. For example, the process 2800 may implement a buffering technique to minimize the number of write operations by creating contiguous memory blocks having block size of the least denomination.

In some embodiments, the at least one channel condition parameter may include an ambient light of an environment. In such embodiments, dynamically modifying the at least one first transmission parameter at step 2804 may be based on the ambient light. For example, in some embodiments, the process 2800 may include the step of modifying brightness of the first display device based on the ambient light.

Similarly, in some embodiments, the process 2800 may further include the step of modifying color space of the first display device. For example, the process 2800 may reduce the information rate by reducing the color space and transmitting the same color into multiple blocks of LEDs. Additionally, in some embodiments, the process 2800 may further include the step of modifying a resolution of a receive frame captured by the first camera device. For example, the process 2800 may magnify the receiver camera to increase the resolution of the transmit frame in order to decode the information present in the frame effectively.

Further, in some embodiments, the process 2800 may further include the step of modifying a number of symbols to be transmitted per frame by the first display device. For example, the process 2800 may control (e.g., improve) the SNR under channel fading condition by switching between single-symbol transmission per frame and multi-symbol transmission per frame under compute resource scenario. Additionally, for example, the process 2800 may improve the SNR under signal impairment condition caused due to deviated/tilted angle of camera capture by the second OCC device with respect to the first OCC device. In particular, if the transmit frame is captured at a titled angle by the camera, the spatial arrangement of the colors may be affected, causing erroneous decoding at the receiver end. Hence, skew correction may be applied in order to proportionately reshape the transmit frame and maintain the spatial arrangement of the colors. Thus, the signal impairment may be corrected and SNR may be improved.

In some embodiments, the process 2800 may further include the step of performing VCR from the first display device upon receiving NACK signal from the first camera device based on a comparison of a NACK score with a threshold NACK score. Additionally, in such embodiments, the process 2800 may include the step of optimizing a number of retransmission frames in the transmit buffer based on a PLER, Further, in such embodiments, the process 2800 may include the step of evaluating a validity of the retransmission based on the PLER.

In some embodiments, the first display device may include a screen based display device configured to display an image or a pattern. Additionally or alternatively, in some embodiments, the first display device may include a set of spatially arranged Light Emitting Diodes (LEDs) configured to display a pattern. Further, in some embodiments, the image or the pattern may be placed inside a colored boundary. For example, the process 2800 may employ guard band in the form of a colored boundary around the transmit frame in order to separate the transmit frame from the noise with minimum processing time.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above pertain to improving efficiency of a bi-directional optical camera communication (OCC). In particular, the techniques provide for:

a) SNR control in order to decrease error propensity. For example, as discussed above, there will be information loss under changing conditions of the signal quality if information rate of transmission is kept constant. In order to avoid the information loss, the information rate may be reduced by decreasing the block size per optical symbol in the form of a color code. Additionally, the information rate may be reduced by reducing the color space and transmitting the same color into multiple blocks of LEDs.

b) PLER monitoring and optimization of the number of retransmission frames in the transmit buffer. For example, as discussed above, a dynamic version of the transmit buffer, based on the NACK from the receiver, may be created. The probability of successful retransmission of packets after transmitting the next version of the transmit buffer is increased by varying the duty cycle of the fragments which were failed to be transmitted in the previous transmissions. This method may significantly reduce the number of retransmissions.

c) Evaluation of the validity of re-transmission based on the MEL with respect to the PLER. The retransmission may either be considered valid, or the packets may be dropped depending on the MEL. The MEL is set based on the channel quality indication present in the NACK score.

d) Display brightness control in order to optimize the power consumption at the screen-based transmitter and to ensure successful transmission. The brightness level may be optimized based on what is required for the successful transmission, thereby addressing the power concerns of the transmitter.

e) Effective utilization of the transmission buffers by implementing dynamic information rate per symbol, which minimizes the number of write operations for efficiency gain in the transmission process.

f) Transmit frame identification by introducing a concept of guard band in the form of a colored boundary in order to extract the transmitted frame correctly and to eliminate the noise around the transmit frame with minimum processing time. It should be noted that may also be implemented for a screen-based transmitter and camera-based receiver.

g) Transmit frame magnification to increase the resolution of the transmit frame captured by the receiver camera in order to decode the information present in the frame effectively.

h) Limiting the transmitter frame rate periodically based on the dynamic processing condition and channel media condition as factors to determine the reception rate of the receiver camera. For example, as discussed above, the ambient illumination at the receiver may be detected using photodetectors in order to modify the transmit parameters accordingly.

i) Knowledge building model to predict the data transmission rate for the future iterations, thereby saving the processing time. Such knowledge model may also be employed to estimate the distance between the transmitter and the receiver. As discussed above, after every iteration, a set of state parameters may be noted in order to build and train the knowledge model Thus, the system and method described in various embodiments discussed above may adaptively and dynamically detect/estimate and modify various transmission parameters (e.g., frame rate) to minimize the bit error rate and, consequently, to maximize the system throughput under various situations (e.g., under various detected/estimated reception parameters). Further, as described in various embodiments discussed above, various reception parameters are themselves dependent on various transmission parameter of paired DCC device or various channel condition parameters.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of improving efficiency of a bi-directional optical camera communication (OCC) between a first OCC device and a second OCC device, the method comprising:

estimating, by a first OCC device comprising a first display device and a first camera device, at least one first transmission parameter with respect to the first display device and at least one first reception parameter with respect to the first camera device, wherein the at least one first reception parameter is based on at least one second transmission parameter of a second OCC device or at least one channel condition parameter, and wherein the at least one second transmission parameter is derived from an analysis of information captured by the second OCC device from the first OCC device, wherein the at least one first transmission parameter comprises a frame rate parameter of the first display device and a block size of a transmission packet to be displayed by the first display device, wherein the frame rate parameter and the block size are dynamically varied to obtain a dynamic rate adaptation; and dynamically modifying, by the first OCC device, the at least one first transmission parameter based on the at least one first reception parameter in order to maximize throughput of OCC.

2. The method of claim 1, further comprising estimating and modifying the frame rate parameter of the first display device based on the at least one first reception parameter, wherein the at least one first reception parameter is determined upon successful reception, by the first camera device, of an OCC packet transmitted from the second OCC device.

3. The method of claim 1, further comprising estimating and modifying the block size of a transmission packet to be displayed by the first display device based on a pre-determined specification of an application transmitting data.

4. The method of claim 3, wherein modifying the block size further comprises creating contiguous memory blocks having block size of a predetermined denomination.

5. The method of claim 1, further comprising performing version controlled re-transmission (VCR) from the first display device upon receiving negative acknowledgement (NACK) signal from the first camera device based on a comparison of a NACK score with a threshold NACK score.

6. The method of claim 5, further comprising at least one of:
   optimizing a number of retransmission frames in the transmit buffer based on a packet loss error rate (PLER); and
   evaluating a validity of the re-transmission based on the PLER.

7. The method of claim 1, further comprising at least one of:
   modifying brightness of the first display device;
   modifying color space of the first display device;
   modifying a number of symbols to be transmitted per frame by the first display device; and
   modifying a resolution of a receive frame captured by the first camera device.

8. The method of claim 1, wherein the at least one channel condition parameter comprises ambient light of an environment, and wherein dynamically modifying the at least one first transmission parameter is further based on the ambient light.

9. The method of claim 1, wherein the first display device comprises at least one of:
   a screen based display device configured to display an image or a pattern; and
   a set of spatially arranged Light Emitting Diodes (LEDs) configured to display a pattern.

10. The method of claim 9, wherein the image or the pattern is placed inside a colored boundary.

11. The method of claim 1, further comprising creating a knowledge building model to predict the at least one first transmission parameter based on historical knowledge.

12. A system for improving efficiency of a bi-directional optical camera communication (OCC) between a first OCC device and a second OCC device, the system comprising:
   a first OCC device comprising a first display device, a first camera device, a processor, and a computer-readable medium storing instructions that, when executed by the processor, cause the at least one processor to perform operations comprising:
      estimating at least one first transmission parameter with respect to the first display device and at least one first reception parameter with respect to the first camera device, wherein the at least one first reception parameter is based on at least one second transmission parameter of a second OCC device or at least one channel condition parameter, and wherein the at least one second transmission parameter is derived from an analysis of information captured by the second OCC device from the first OCC device, wherein the at least one first transmission parameter comprises a frame rate parameter of the first display device and a block size of a transmission packet to be displayed by the first display device, wherein the frame rate parameter and the block size are dynamically varied to obtain a dynamic rate adaptation; and
      dynamically modifying, by the first OCC device, the at least one first transmission parameter based on the at least one first reception parameter in order to maximize throughput of OCC.

13. The system of claim 12, wherein the at least one first transmission parameter comprises the frame rate parameter of the first display device, and wherein the at least one first reception parameter is determined upon successful reception, by the first camera device, of an OCC packet transmitted from the second OCC device.

14. The system of claim 12, wherein the at least one first transmission parameter comprises the block size of a transmission packet to be displayed by the first display device, and wherein the block size of the transmission packet is dynamically modified based on a pre-determined specification of an application transmitting data.

15. The system of claim 12, wherein the operations further comprise performing version controlled re-transmission (VCR) from the first display device upon receiving negative acknowledgement (NACK) signal from the first camera device based on a comparison of a NACK score with a threshold NACK score.

16. The system of claim 12, wherein the operations further comprise at least one of:
   modifying brightness of the first display device;
   modifying color space of the first display device;
   modifying a number of symbols to be transmitted per frame by the first display device; and
   modifying a resolution of a receive frame captured by the first camera device.

17. The system of claim 12, wherein the at least one channel condition parameter comprises ambient light of an environment, and wherein dynamically modifying the at least one first transmission parameter is further based on the ambient light.

18. The system of claim 12, wherein the first display device comprises at least one of:
   a screen based display device configured to display an image or a pattern; and
   a set of spatially arranged Light Emitting Diodes (LEDs) configured to display a pattern.

19. The system of claim 18, wherein the image or the pattern is placed inside a colored boundary.

20. A non-transitory computer-readable medium storing computer-executable instructions for improving efficiency of a bi-directional optical camera communication (OCC) between a first OCC device and a second OCC device, the non-transitory computer-readable medium configured for:
   estimating at least one first transmission parameter with respect to a first display device and at least one first reception parameter with respect to a first camera device, wherein the first camera device and the first display device are a part of the first OCC device, wherein the at least one first reception parameter is based on at least one second transmission parameter of a second OCC device or at least one channel condition parameter, and wherein the at least one second transmission parameter is derived from an analysis of information captured by the second OCC device from the first OCC device, wherein the at least one first transmission parameter comprises a frame rate parameter of the first display device and a block size of a transmission packet to be displayed by the first display device, wherein the frame rate parameter and the block size are dynamically varied to obtain a dynamic rate adaptation; and dynamically modifying the at least one first transmission parameter based on the at least one first reception parameter in order to maximize throughput of OCC.

* * * * *